US012391539B2

(12) United States Patent
Lanzrath et al.

(10) Patent No.: US 12,391,539 B2
(45) **Date of Patent: *Aug. 19, 2025**

(54) DISPENSING PORTIONER

(71) Applicant: Lowtemp Industries LLC, Arvada, CO (US)

(72) Inventors: Levi Garrett Lanzrath, Lakewood, CO (US); Jack Camins, Denver, CO (US)

(73) Assignee: Lowtemp Industries LLC, Arvada, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/026,128

(22) Filed: Jan. 16, 2025

(65) Prior Publication Data

US 2025/0162857 A1 May 22, 2025

Related U.S. Application Data

(63) Continuation of application No. 18/954,024, filed on Nov. 20, 2024.

(60) Provisional application No. 63/551,571, filed on Feb. 9, 2024, provisional application No. 63/600,817, filed on Nov. 20, 2023.

(51) Int. Cl.
*B67D 7/18* (2010.01)
*B67D 7/28* (2010.01)
*B67D 7/30* (2010.01)

(52) U.S. Cl.
CPC ................. *B67D 7/18* (2013.01); *B67D 7/28* (2013.01); *B67D 7/302* (2013.01)

(58) Field of Classification Search
CPC ............. B67D 7/18; B67D 7/28; B67D 7/302
See application file for complete search history.

(56) References Cited

U.S. PATENT DOCUMENTS 4,051,984 A * 10/1977 Ho ......................... A47G 19/18 222/571
4,324,348 A * 4/1982 Johnson ................. A47K 5/122 222/212
4,517,917 A * 5/1985 Santefort .................. B05C 5/02 118/302
4,923,096 A * 5/1990 Ennis, III ............ B05C 17/0123 222/326
5,052,591 A * 10/1991 Divall ...................... B65B 3/326 137/625.48
5,240,502 A * 8/1993 Castaldo ............. B05C 11/1023 239/114
5,441,173 A * 8/1995 Koval ...................... A21C 5/00 222/63
5,788,128 A * 8/1998 Hickey ................. B65C 9/2221 222/504
6,024,250 A * 2/2000 Hickey ................... B05B 15/52 222/63

(Continued)

*Primary Examiner* — Frederick C Nicolas
(74) *Attorney, Agent, or Firm* — Avek IP, LLC

(57) ABSTRACT

A portion dispensing system including a portioner configured with a controller. The portioner includes a piston configured to move within a container and force product in the container out of a nozzle opening. The controller controls the piston to dispense an input product weight and can detect the weight of dispensed product. The controller can adjust the piston to provide different weights of dispensed product and can provide pullback to substantially provide accurate dosing and eliminate product from oozing out of the nozzle opening.

20 Claims, 18 Drawing Sheets

(56) References Cited

U.S. PATENT DOCUMENTS

| | | | | |
|---|---|---|---|---|
| 6,257,451 | B1 * | 7/2001 | Siegel | B05B 15/50 239/106 |
| 6,264,066 | B1 * | 7/2001 | Vincent | A23G 9/228 222/105 |
| 6,997,216 | B2 * | 2/2006 | Ryu | G02F 1/1341 349/189 |
| 7,743,948 | B2 * | 6/2010 | Drennow | A47G 19/183 222/472 |
| 8,257,779 | B2 * | 9/2012 | Abernathy | G05D 7/0629 118/712 |
| 8,544,686 | B2 * | 10/2013 | Williams | B05C 17/00583 222/402.1 |
| 8,910,831 | B2 * | 12/2014 | Williams | B05C 17/0146 222/402.1 |
| 9,033,189 | B2 * | 5/2015 | Sato | B05C 17/002 222/110 |
| 9,114,415 | B2 * | 8/2015 | Williams | B05C 17/015 |
| 9,487,341 | B2 * | 11/2016 | Ineichen | B05B 15/52 |
| 10,906,058 | B2 * | 2/2021 | Nelson | B05B 12/004 |
| 2011/0048575 | A1 * | 3/2011 | Abernathy | B05C 5/001 141/1 |
| 2013/0032244 | A1 * | 2/2013 | Boboltz | B01F 33/846 141/83 |
| 2014/0103074 | A1 * | 4/2014 | Sato | B05C 11/1039 222/336 |
| 2015/0114991 | A1 * | 4/2015 | Alekseyev | F16N 11/08 222/23 |
| 2023/0119346 | A1 | 4/2023 | Joseph et al. | |

* cited by examiner

DISPENSING PORTIONER

CROSS-REFERENCE TO RELATED APPLICATIONS

This application is a continuation of U.S. patent application Ser. No. 18/954,024, filed Nov. 20, 2024, which claims the benefit of U.S. Provisional Patent Application No. 63/600,817, filed Nov. 20, 2023, and U.S. Provisional Patent Application No. 63/551,571, filed Feb. 9, 2024, the entire contents thereof are herein incorporated by reference.

BACKGROUND OF THE INVENTION

1. Field

The disclosed embodiments relate generally to the field of product dispensers. More specifically, the disclosed embodiments relate to the field of automatically dispensing a flowable solid.

2. Description of the Related Art

It is known to have a product dispenser which dispenses a flowable solid.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a portioner including: a user interface communicatively connected to a controller configured to receive a product setpoint weight; a scale communicatively connected to the controller and configured to detect a dispensed product weight when product is dispensed out of a container; the controller being communicatively and operatively connected to a shaft motor wherein the shaft motor is configured to drive a piston within the container and force the product out of the container; the controller being configured to: receive the product setpoint weight and determine a piston setpoint based on the product setpoint weight; and implement the piston setpoint to the piston and dispense the product out of the container; when the product is dispensed, the controller being configured to receive the dispensed product weight and modify the piston setpoint based on the dispensed product weight.

In some embodiments, the techniques described herein relate to a portioner including a nozzle opening wherein the product in the container is directed out of the nozzle opening when the product is being dispensed.

In some embodiments, the techniques described herein relate to a portioner wherein the piston is mounted to an end of a drive shaft and the shaft motor actuates the drive shaft.

In some embodiments, the techniques described herein relate to a portioner wherein the piston includes a downwardly-extending conical end configured to form a seal against inner walls of the container when the piston is driven in the container.

In some embodiments, the techniques described herein relate to a portioner including a wire positioned beneath the nozzle opening and configured to move across the nozzle opening and cut through the product when the piston forces the product out of the nozzle opening.

In some embodiments, the techniques described herein relate to a portioner including a pair of clamps configured to secure the container to the portioner.

In some embodiments, the techniques described herein relate to a portioner wherein the container includes flanges which extend from the container at either end.

In some embodiments, the techniques described herein relate to a portioner wherein the pair of clamps includes a groove configured to receive the flanges and secure the container to the portioner.

In some embodiments, the techniques described herein relate to a portioner wherein the controller includes a machine learning component including data corresponding to piston setpoints and dispensed product weights, and product setpoint weights.

In some embodiments, the techniques described herein relate to a portioner wherein the machine learning component determines the piston setpoint based on the product setpoint weight.

In some embodiments, the techniques described herein relate to a portioner wherein when the product is dispensed, the machine learning component receives the dispensed product weight and modifies the piston setpoint based on the dispensed product weight.

In some embodiments, the techniques described herein relate to a portioner wherein the controller implements pullback to the piston which causes product hanging from beneath the nozzle opening to be sucked back into the container.

In some embodiments, the techniques described herein relate to a portioner wherein the user interface is a touchscreen interface.

In some embodiments, the techniques described herein relate to a method for dispensing a product with a portioner, the method including: receiving a product setpoint weight from a user interface wherein the product setpoint weight is an amount of product to be dispensed from a container; determining a piston setpoint based upon the product setpoint weight wherein the piston setpoint corresponds to a distance a piston is driven within a container; driving the piston within the container to dispense the product; receiving a dispensed product weight from a scale configured to collect product dispensed from the container; and modifying the piston setpoint based upon the product setpoint weight and the dispensed product weight.

In some embodiments, the techniques described herein relate to a method including centrifuging the container loaded with product in a centrifuge prior to driving the piston within the container.

In some embodiments, the techniques described herein relate to a method including securing the container to the portioner using a pair of clamps prior to driving the piston within the container.

In some embodiments, the techniques described herein relate to a method including modifying the piston setpoint to provide pullback thereby creating a vacuum within the container which can pull product hanging beneath a nozzle opening of the container back into the container.

In some embodiments, the techniques described herein relate to a method wherein the piston is driven by a drive shaft connected to a shaft motor.

In some embodiments, the techniques described herein relate to a method including moving a wire across the nozzle opening and cutting through product hanging beneath the nozzle opening.

In some embodiments, the techniques described herein relate to a portioner including: a piston mounted to a drive shaft configured to drive the piston upwards and downwards in a container; a nozzle opening configured to align with the container and direct a product out of the container when the piston is driven downwards; a wire positioned beneath the nozzle opening and configured to move across the nozzle opening and cut through the product when the piston forces the product out of the nozzle opening.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
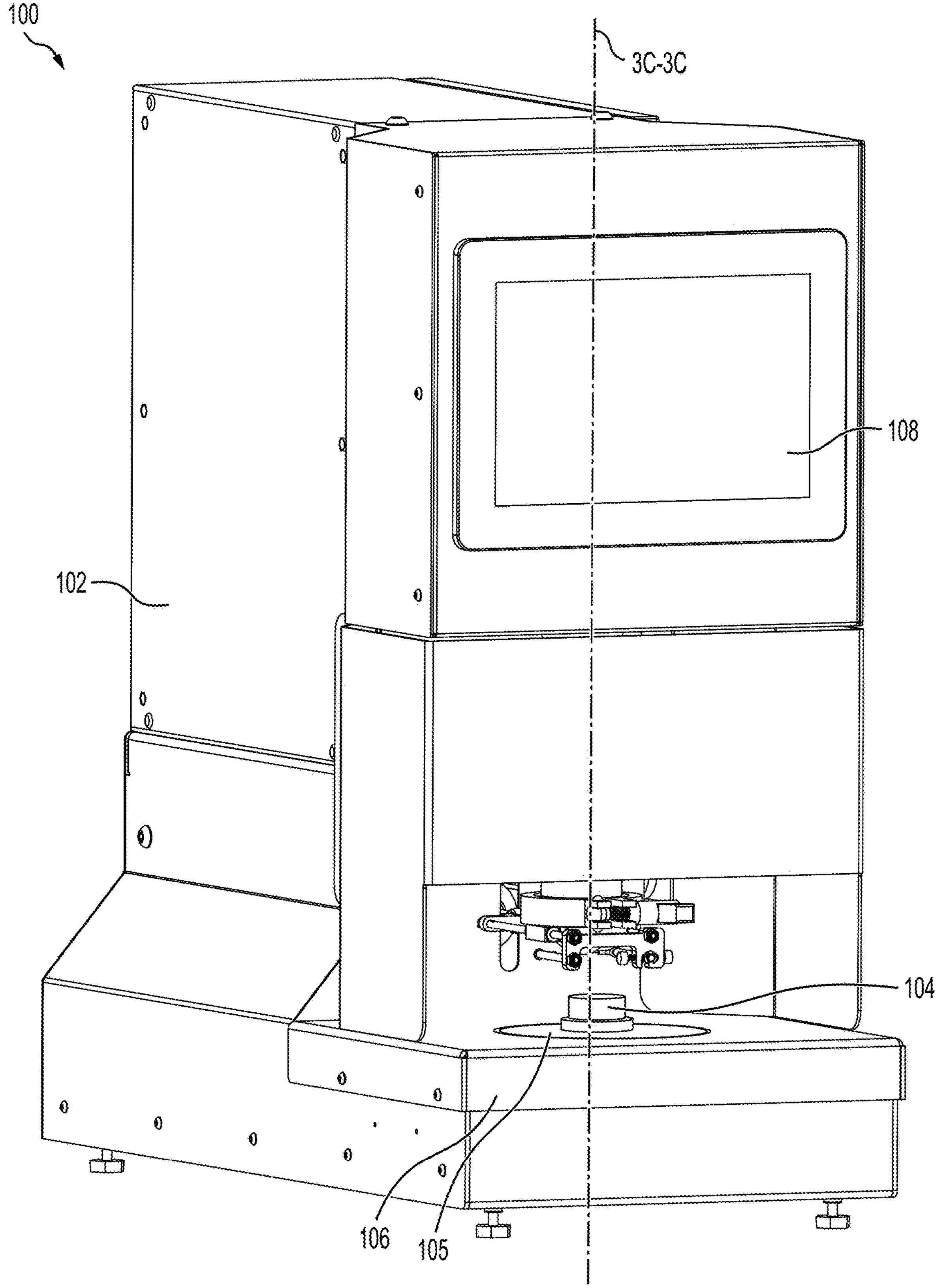
FIG. 1 is a perspective view of a dispensing portioner of embodiments of the present disclosure.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Dispensing portioner machines currently used for dispensing a portion of a product may be inaccurate and inefficient. Current arrangements typically heat, melt, and flow the product or concentrate using gravity. Current processes may degrade the product and make it very difficult to maintain weight accuracy when dispensing. In some prior arrangements, gases such as compressed air and pressurized nitrogen can degrade the product and make a substantially less pure product. A system and a method are needed which substantially improve upon current dispensing portioners by providing greater accuracy and efficiency while limiting the exposure of the product to elevated temperatures.

Embodiments disclosed herein provide a system and a method for a substance portioning system. In embodiments, this might be a concentrate or product dosing system, e.g., for rosin or other materials. The portioner includes mechanisms and a control system, which by way of extrusion without adding heat, dispenses portions of product into a dish and weighs the amount of product dispensed. The system portioner uses pressure administered by a motorized plunger or ram to force an unheated desired amount of product out of a removable shell through a nozzle. The portioner includes a cutting wire (which can be optionally heated). The wire is configured to move across the nozzle to cut an appropriate length of product. Because the cut portions of product are not melted and are emitted from the nozzle with a consistent diameter, the accuracy in dispensing can be more exact.

Additionally, the dispensing portioner includes machine learning capabilities such that, as portions, e.g., of solid or substantially solid product, are cut and dropped into a dish resting on a scale, weight feedback is transmitted to a processing component as each portion of product is dropped into the dish. This allows for continual portioner adjustment in the dispensing and cutting processes to either increase or decrease the time between cuts to consequently increase or decrease the weight of the product portions being dispensed. In some embodiments, the flow rate or the rate of product being dispensed may also be increased or decreased to produce a weight of the product portions.

FIG. 1 shows a perspective view of the dispensing portioner 100. The portioner 100 includes a shell 102 covering the components of and forming the structure for the portioner 100. In embodiments, the shell 102 may be formed using UL industrial control panels which are manufactured and certified according to the UL 508A standard (i.e., a hazardous area mark). The portioner 100 includes a dish 104 positioned on a platform 106. In embodiments, the dish 104 is bowl shaped to collect a product dispensed from the portioner 100, but in other embodiments may be a vial or other container which may be used to collect product. In embodiments, an electronic scale 105 is built into the platform 106 and located immediately underneath the dish 104. The scale 105 is configured to detect the weight of a portion of product (concentrate) that is received into the dish 104. To do this, the weight of the dish 104 can be calibrated prior to the dish 104 receiving a portion of product. The scale 105 can be communicatively connected to a controller 101 (see FIG. 2A and FIG. 7) via wire or wireless connection.

Figure 2A:
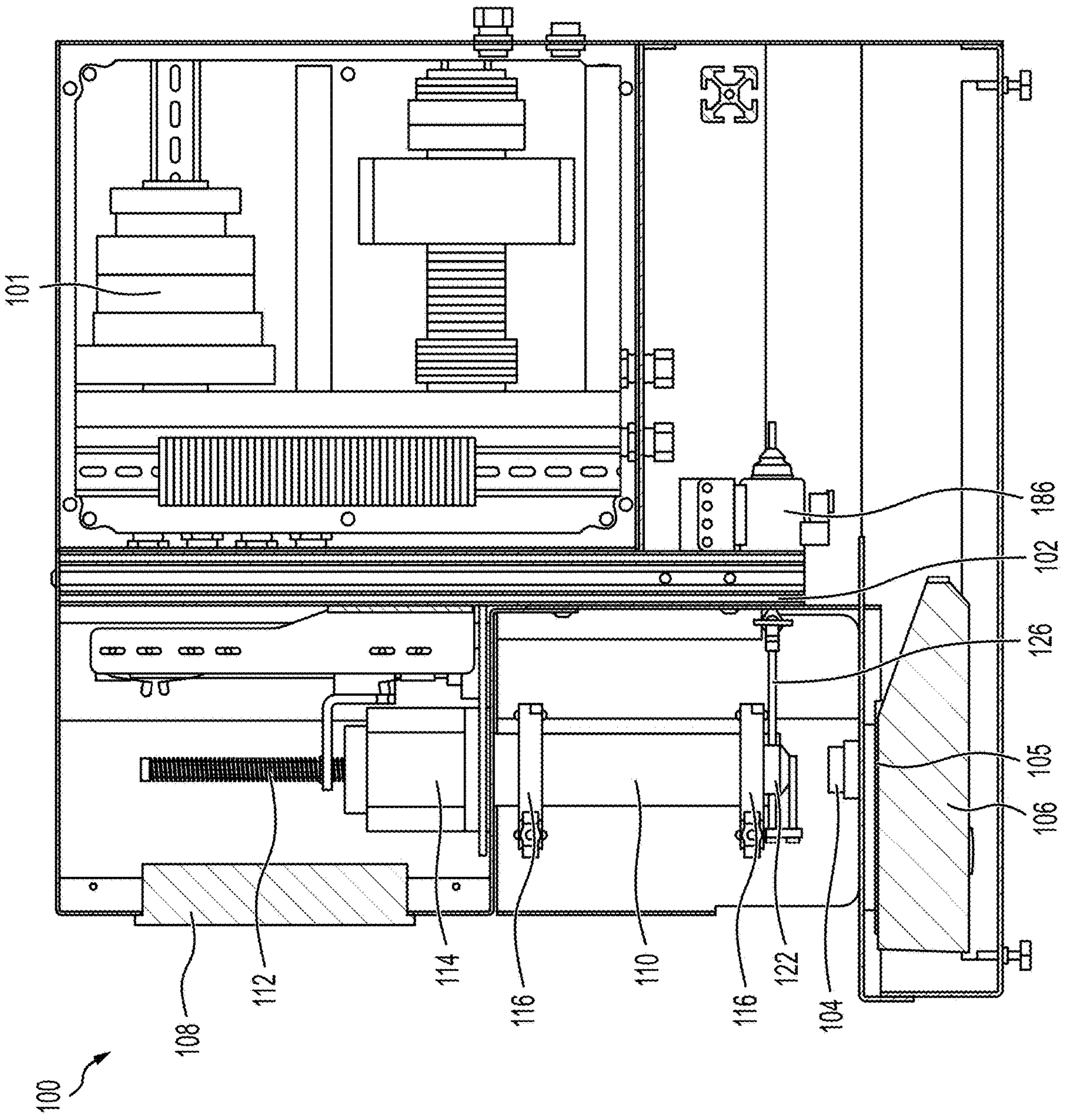
FIG. 2A is a side view of the dispensing portioner of FIG. 1 with a side panel removed.
Figure 2B:
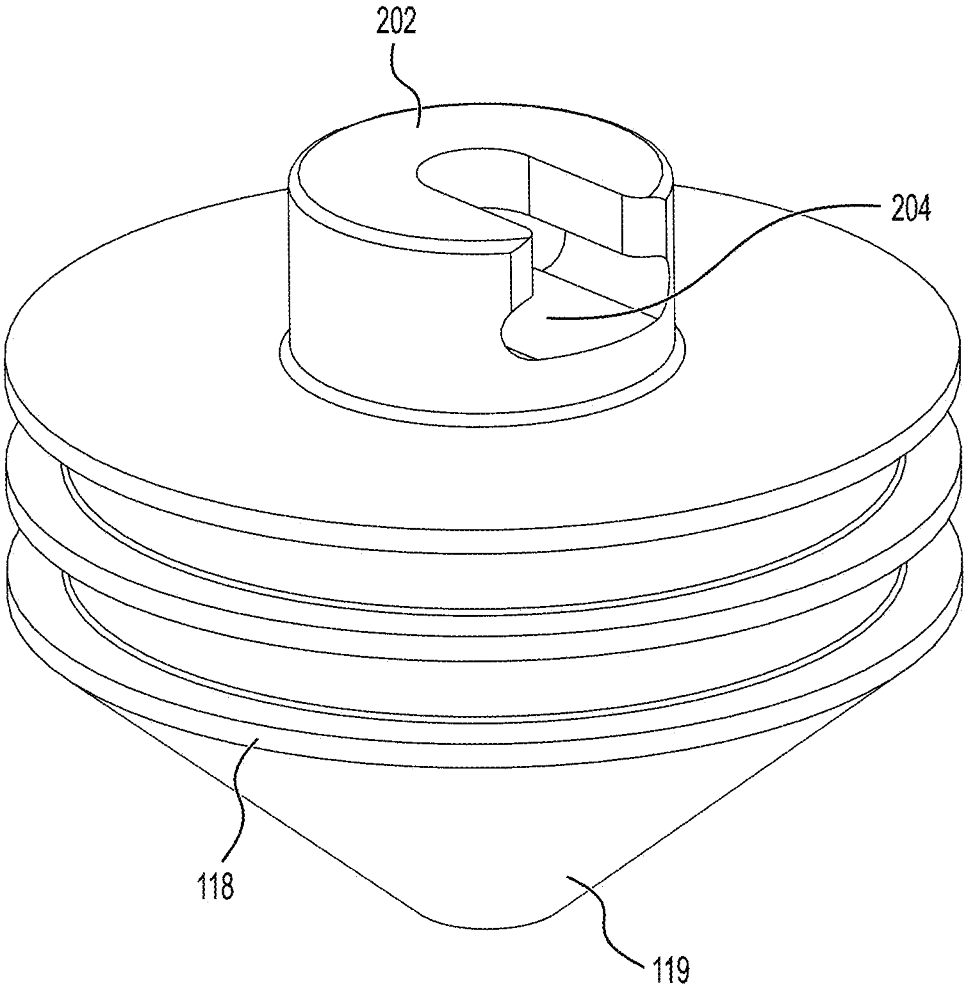
FIG. 2B is a close-up perspective view of the piston of the dispensing portioner of FIG. 1.

FIG. 2A shows a side perspective view of the portioner 100 with a side panel of the shell 102 removed. The portioner 100 includes a container 110 which is configured to be coupled to a shaft 112. In embodiments, and shown in FIG. 2B, a piston 118 includes an extension 202 with a slot 204 which allows the piston 118 to be removable from shaft 112. The extension 202 extends away from the piston 118 such that the slot 204 engages with the shaft 112. The shaft 112 is driven by shaft motor 114 which may be a step motor. The container 110 is cylindrically shaped in embodiments and is removably securable around the shaft 112 using a pair of removable clamps 116. Clamps 116 include adjustable screws that enable the container 110 to be secured at upper and lower portions around the shaft 112. Additionally, the clamps 116 can be a tri-clamp that includes a screw adjustment enabling the clamping diameter to be adjusted to accommodate the container size or to fine tune the clamping action. Thus, a lever action is used to remove each clamp at each location. Clamps 116 can be attached and removed to make the container 110 removable from, and reinstallable onto the portioner 100.

Figure 3A:
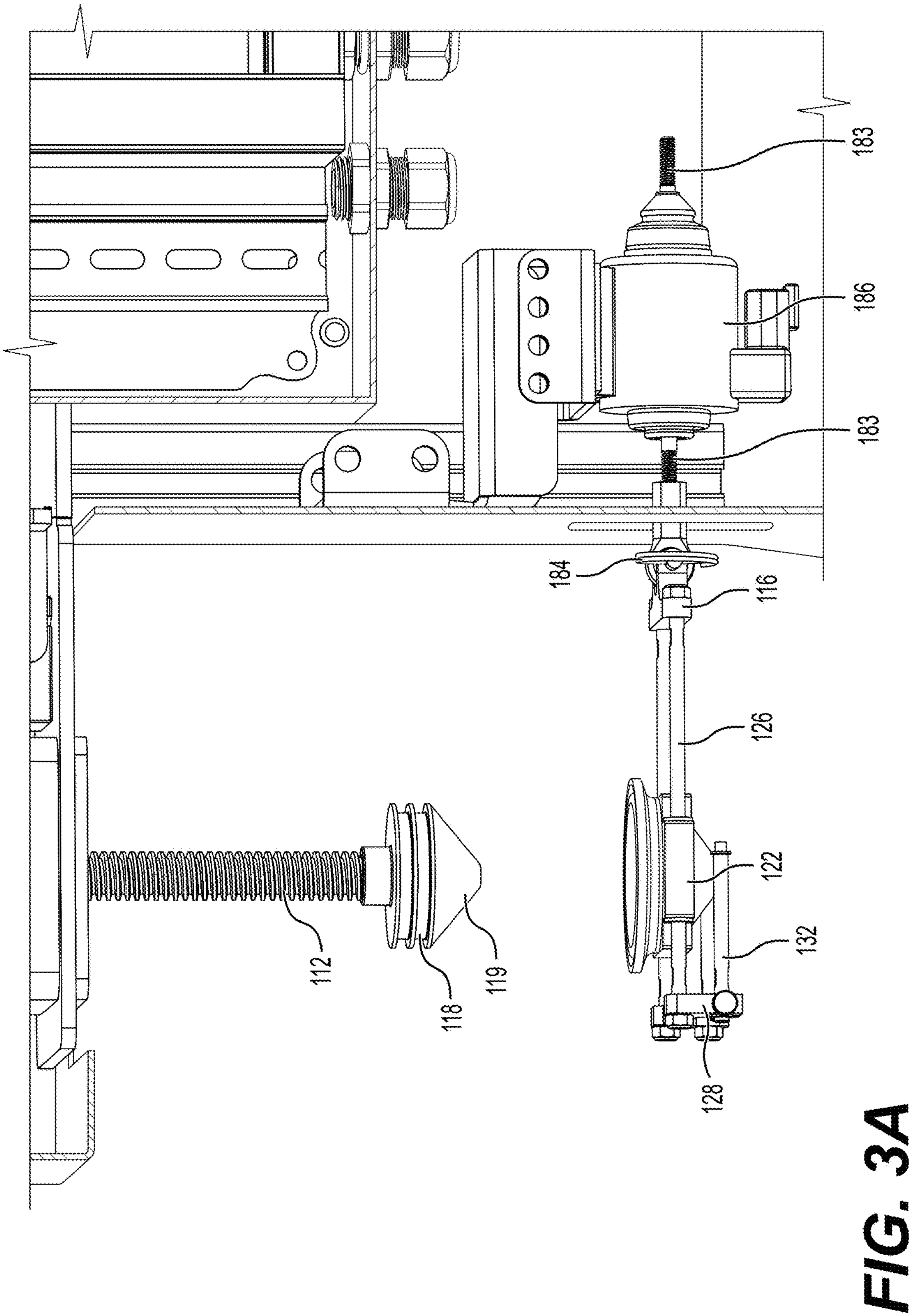
FIG. 3A is a side view of the dispensing portioner of FIG. 1 with a container removed to reveal a shaft and a plunger.
Figure 3B:
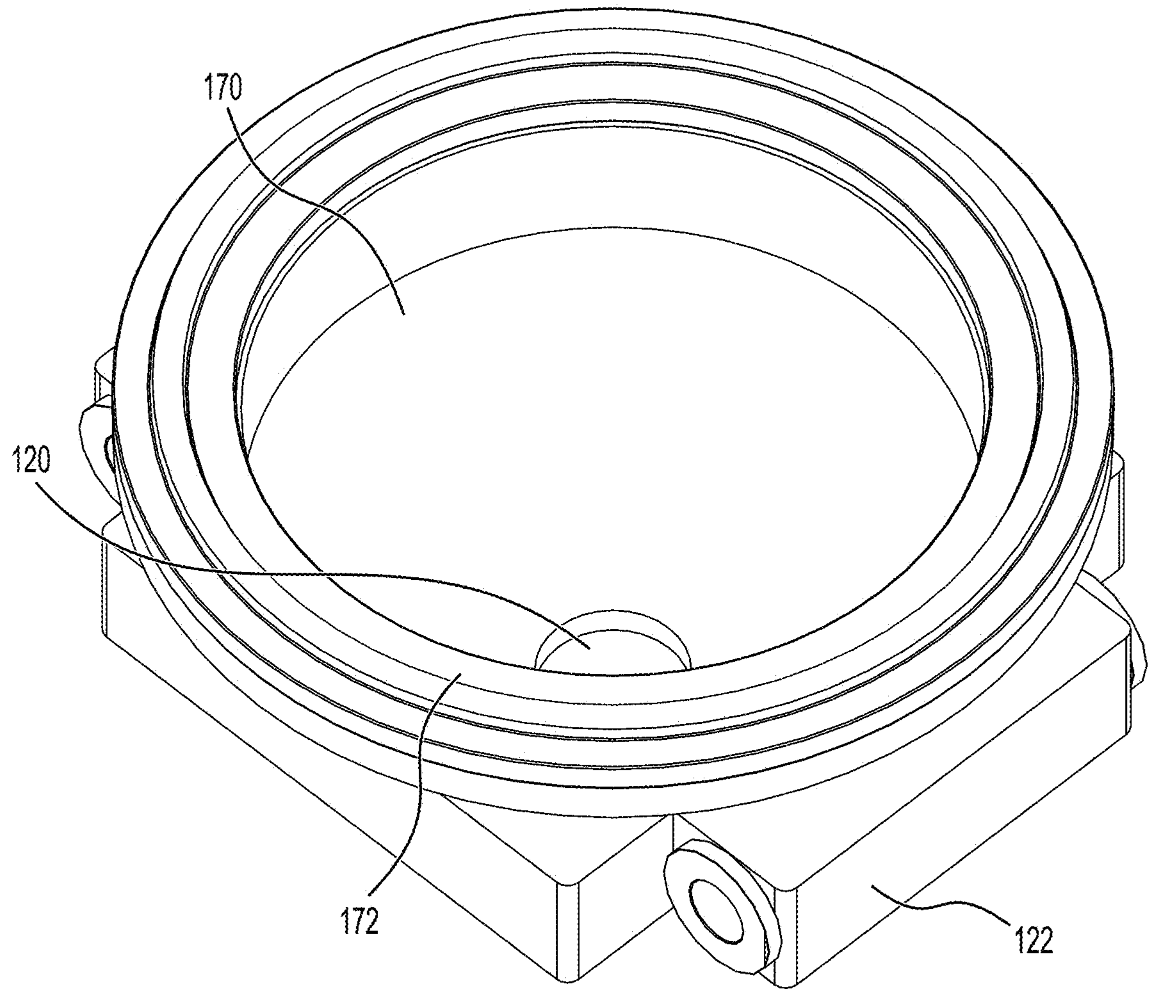
FIG. 3B is a top perspective view of a nozzle platform of the dispensing portioner of FIG. 1.
Figure 3C:
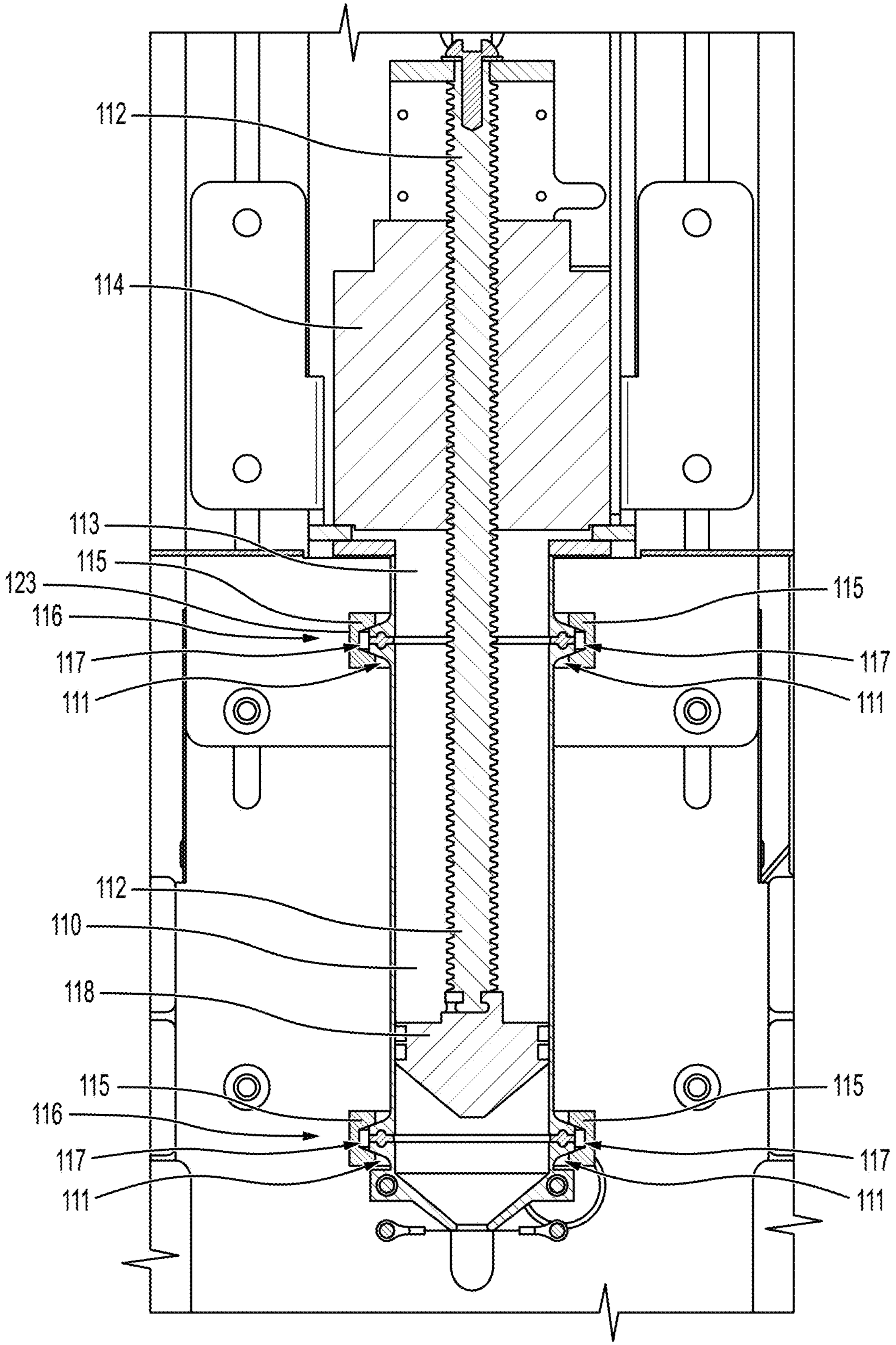
FIG. 3C is a cross-sectional view of the shaft of the dispensing portioner of FIG. 1 taken along the line 3C-3C shown in FIG. 1.
Figure 3D:
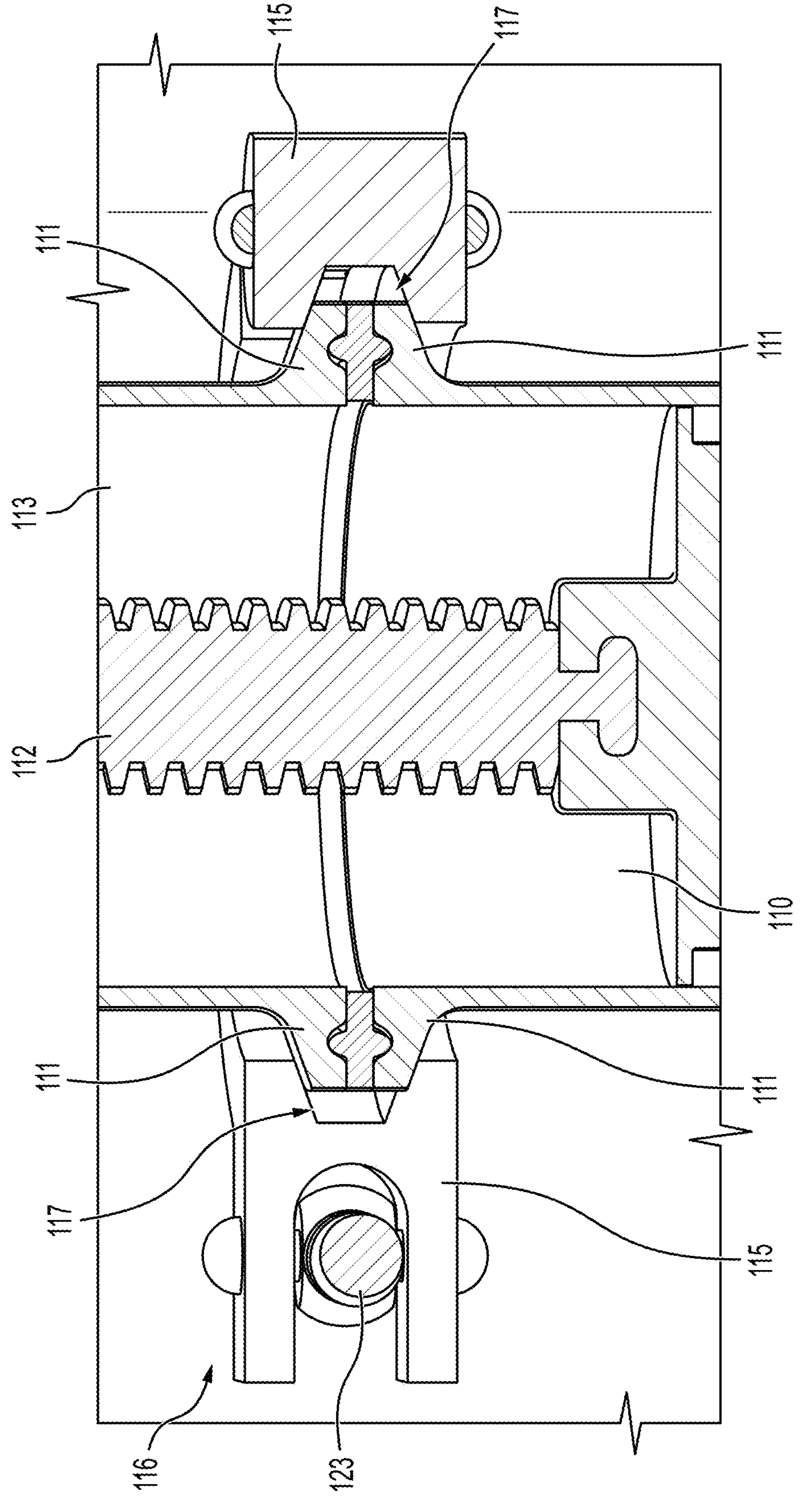
FIG. 3D is a close-up cross-sectional view of the shaft of the dispensing portion of FIG. 1 taken along the line 3C-3C shown in FIG. 1.

FIG. 3C shows a cross-sectional view taken along the line 3C-3C shown in FIG. 1 of the shaft 112 extending through the container 110 secured using clamps 116. FIG. 3D shows a close-up view of the upper edge of container 110 connected to the container extension 113 using a clamp 116. The container 110 includes flanges 111 which form an extended or outcropped edge at the upper and lower ends of the container 110. The container 110 at its upper end is connected to a container extension 113 extending from the upper clamp 116 to abut the shaft motor 114 from underneath. At its lower end, the container 110 is connected to an upper edge 172 (see FIG. 3B) of a nozzle platform 122. The container extension 113 and the container extension 113 each include flanges 111. The clamps 116 each include a groove 117 recessed into a clamping arm 115. The groove 117 recessed into the clamping arms 115 allow for the flanges 111 on each end of the container 110, the container extension 113, and the upper edge 172 to insert and be secured by the clamping arms 115. In embodiments, the groove 117 of the upper clamp 116 allows for the flanges 111 of the upper end of the container 110 and the container extension 113 to be secured while the groove 117 of the lower clamp 116 allows for the flanges 111 of the lower end of the container 110 and the upper edge 172 to be secured. The clamping arms 115 are adjustable using a screw 123 (see FIG. 3D) which increases or decreases the diameter of the clamping arms 115 such that the flanges 111 of the container 110 may be removed or secured by the clamping arms 115 of the clamps 116.

The shaft 112 is configured to translate upwards and downwards within the container 110 as it is driven by the shaft motor 114. In embodiments, the shaft motor 114 may be a stepper motor or a servo motor configured to drive the shaft 112 upwards and downwards in alignment with a vertical direction. FIG. 2A shows the shaft 112 at a lowered position.

FIG. 3A shows a close-up side perspective view of the portioner 100 with the container 110 removed to reveal the portion of the shaft 112 extending through the container 110 and the mounted piston 118 configured on an end of the shaft 112. In embodiments, the container 110 may be removed by loosening the clamps 116 which in embodiments is accomplished by loosening screw 123 adjusting the diameter of each clamp 116 to force the clamp 116 to constrict against the flanges 111 of the container 110. The shaft 112 at its lower end is attached to the piston 118. In embodiments, the piston 118 is configured with extension 202 and slot 204 so that it is detachable from the shaft 112. Removal of the piston head 118 from the shaft 112 (in embodiments) may be necessary to allow for the container 110 to be removed separately from piston 118, or for the piston 118 to be removed with container 110. In embodiments, the piston 118 has a cylindrical outer surface making a precise clearance fit within the cylindrical internal surfaces of the container. Thus, the piston 118 slides vertically within the container 110 so the outer edges of the piston 118 substantially form a seal against the inner walls of the container 110. The piston 118 includes a downwardly-extending conical end 119 such that when the piston 118 translates downwards in the container 110 due to force generated by the shaft motor 114, product is forced out through a nozzle opening 120 (FIGS. 3B and 4A) configured on the nozzle platform 122.

The nozzle platform 122 is positioned directly below the lower of the clamps 116 when clamp 116 secures the container 110. The upper edge 172 (see FIGS. 3B and 3C) of the nozzle platform 122 abuts and inserts into the groove 117 of the clamp 116. The nozzle platform 122 is configured and aligned with the container 110, such that the conical end 119 of the piston 118 aligns with a conically shaped chamber 170 (FIG. 3B) within the nozzle platform 122. Thus, driving the conical piston head 118 downward forces product from the container 110 to engage the internal surfaces in the chamber 170 and then out the aperture 120 below the nozzle platform 122.

Figure 6A:
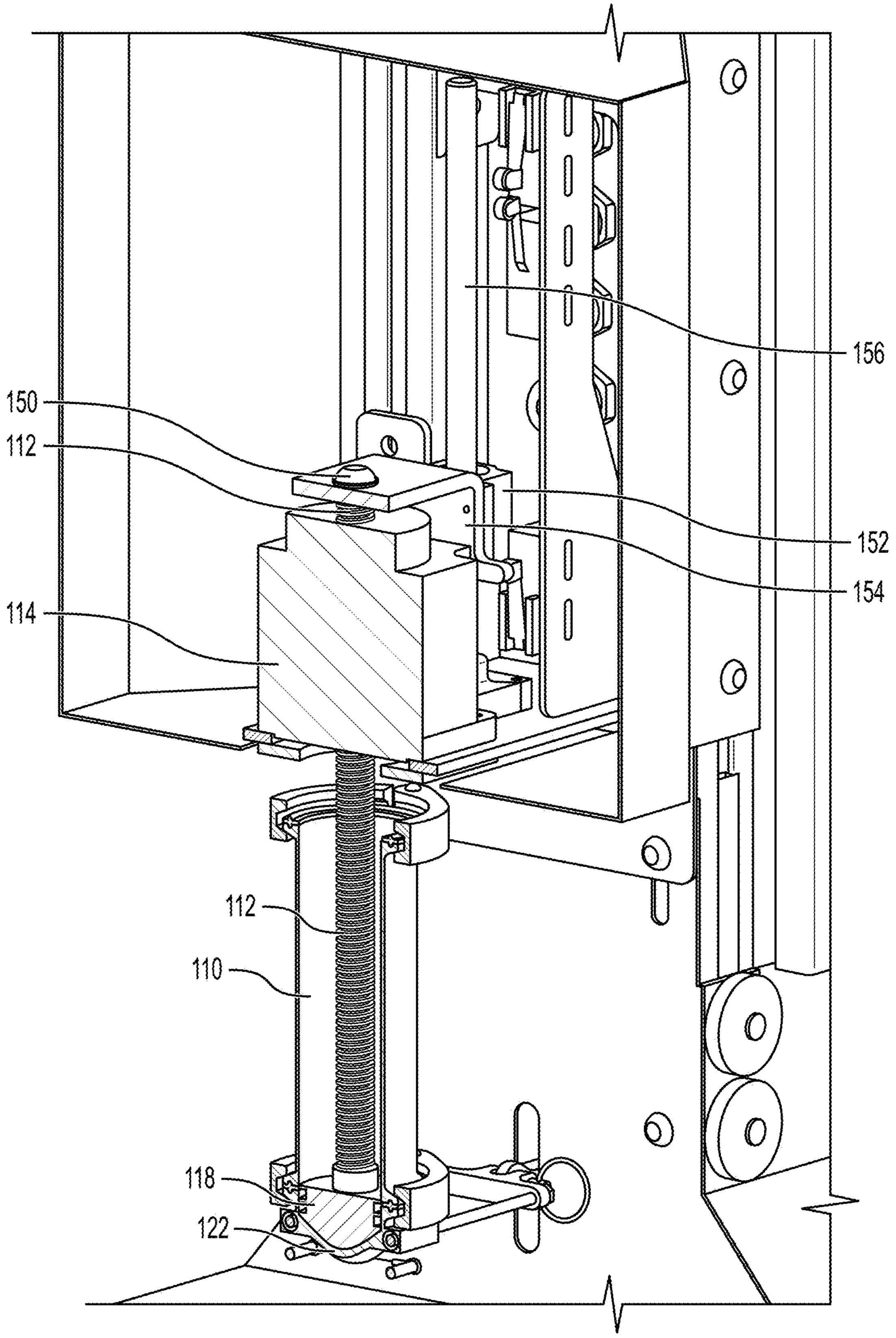
FIG. 6A is a cross-sectional view taken at a perspective along the line 3C-3C shown in FIG. 1 of the dispensing portioner of FIG. 1.

FIG. 6A shows a cross-sectional view of the portioner 100 revealing the shaft 112 extending up into the driving motor 114. In FIG. 6A, container extension 113 is removed, but can be seen in FIG. 3C. Both figures show the container 110 with the lower end of the shaft 112 mounted to the piston 118.

Figure 6B:
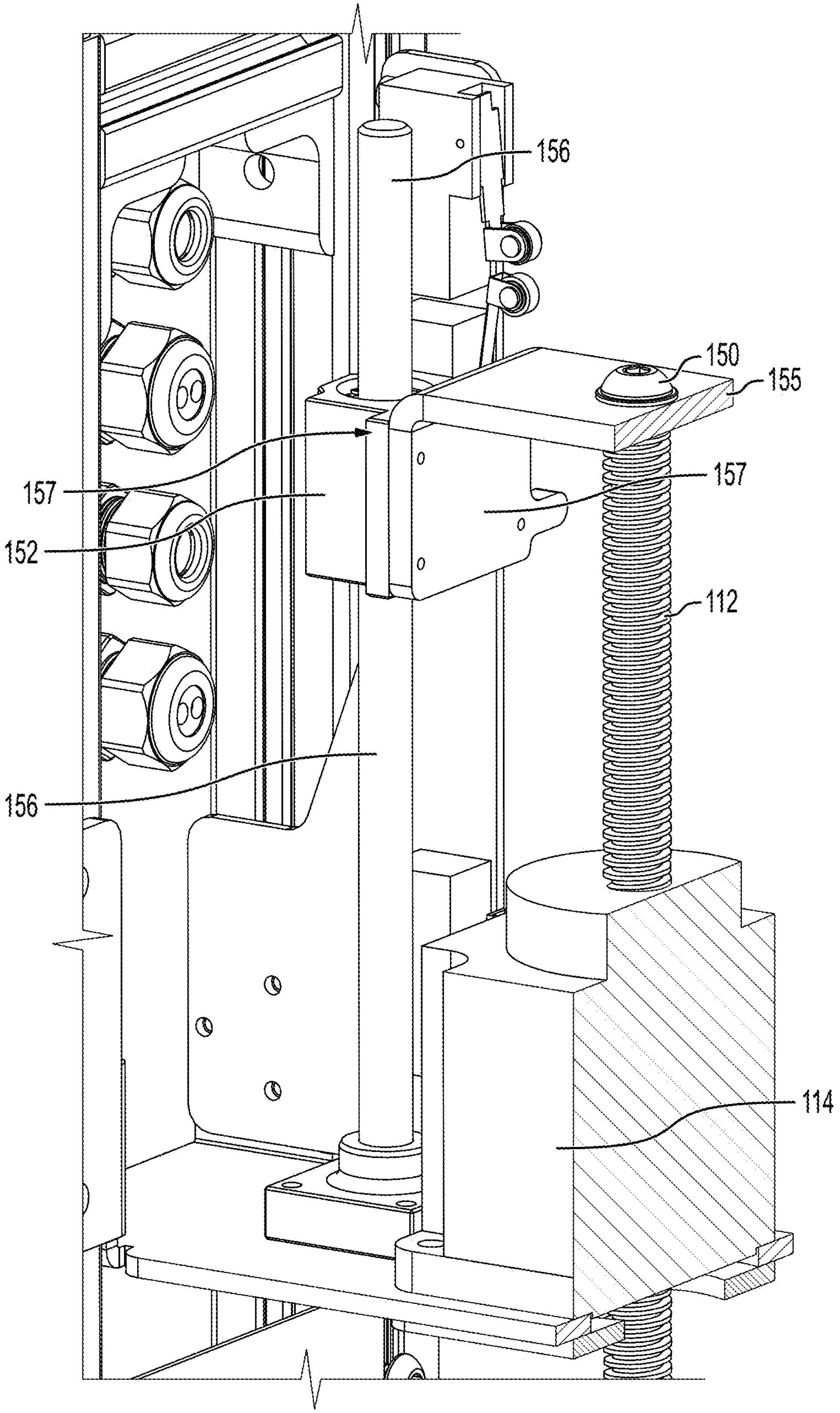
FIG. 6B is a close-up view of the shaft and slide mount of the dispensing portioner of FIG. 1.

FIG. 6B shows the upper end of the drive shaft 112 is fixed to a forwardly-extending portion 155 of the bracket 154 by a bolt (threaded portion of bolt not shown but is received into reciprocating threads existing in the top end of drive shaft 112.) The forwardly extending portion 155 is secured onto the top of the shaft 112 by a bolt head 150.

In embodiments, the bracket 154 has an inverted L shape such that a downwardly extending back portion 157 of the L includes a vertical collar 152 which is configured to slidingly receive a vertical guide rod 156. Collar 152 is configured to vertically slide along guide rod 156. The lateral stability provided by the guide rod 156 being constrained by the collar 152 allows the shaft 112 to remain vertically aligned when moving upwards and downwards when actuated by the shaft motor 114.

FIG. 6B shows a close-up perspective view of the upper end of the shaft 112 which extends upwards from the shaft motor 114 and includes the bolt head 150, collar 152, and the bracket 154 from another perspective. As can be seen in FIG. 6B, the connected bracket 154 and shaft 112 have moved upward relative to the position shown in FIG. 6A. Again, it can be seen that the collar 152 tracks the bracket 154 along the guide rod 156. The guide rod 156 is vertically aligned and slides through the collar 152 which slides upwards and downwards as the shaft motor 114 drives the shaft 112 upwards or downwards. The guide rod 156 substantially keeps the collar 152 aligned and consequently as the shaft 112 is driven, the collar 152 and bracket 154 keeps the shaft 112 aligned with the shaft motor 114 and container 110.

Referring back to FIG. 3B, a close-up perspective view of the nozzle platform 122 reveals some specifics regarding the configuration of the part. More specifically, the nozzle platform 122, in embodiments, includes an outcropped, circular, upper edge 172 extended away from the nozzle platform 122. The upper edge 172 forms a top edge of the recessed conical chamber 170. The upper edge 172 and the recessed conical chamber 170 are sized such that the conical end 119 of the piston 118 is received therein when the shaft 112 is moved downwards. Initially, a cylinder loaded with product to be dispensed will be compacted downward by the conical end 119 of the piston 118 dispensing product down through the nozzle opening 120. At a lowest extension of a product dispensing, the conical piston end 119 will mate with the complementary conical shape defined by the internal surfaces of the chamber 170 in the platform 122. As the piston reaches a bottom-most extent, the matching shapes allow substantially all the product to be forced out of the nozzle opening 120.

Figure 4A:
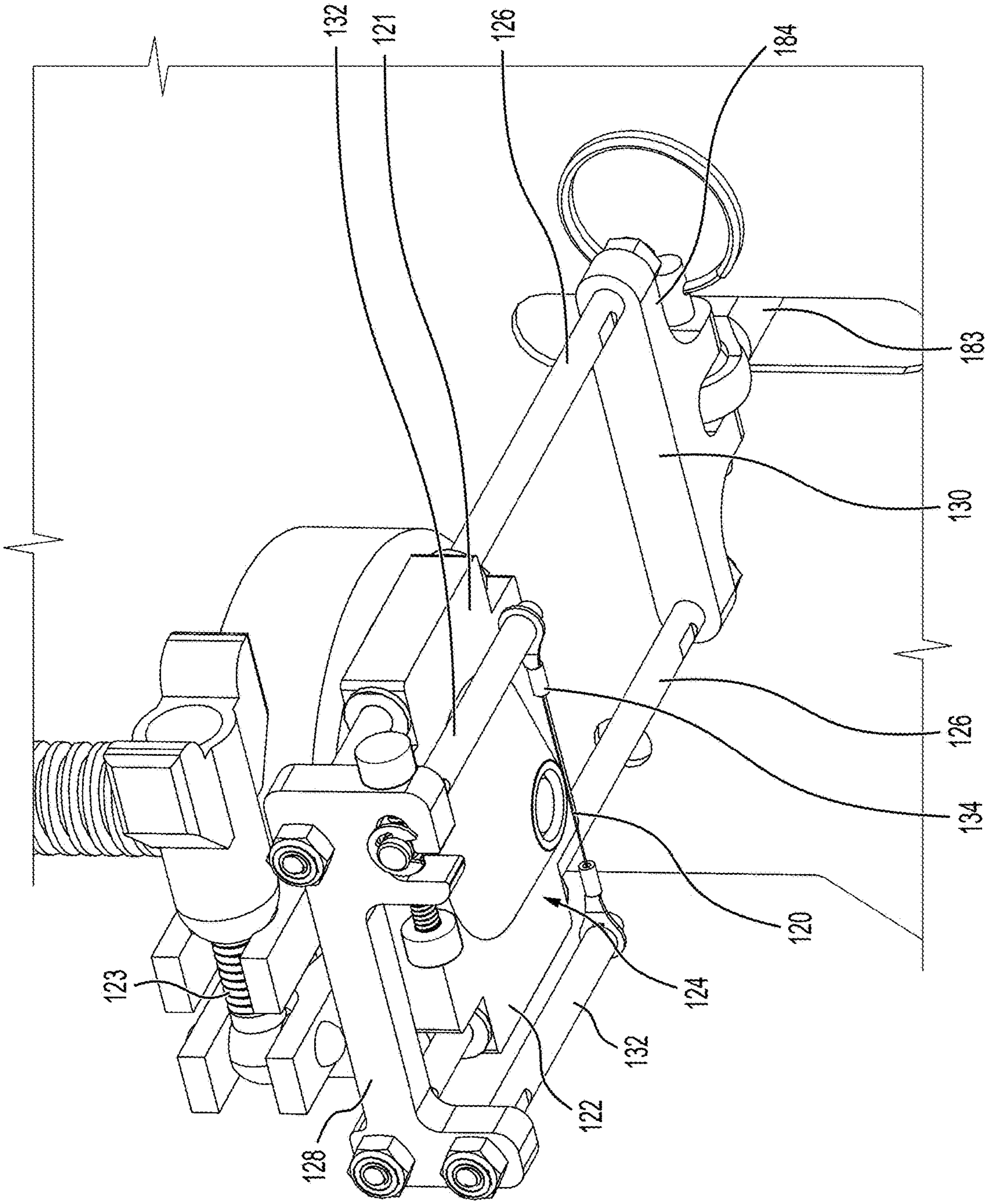
FIG. 4A is an underneath perspective view of the dispensing portioner of FIG. 1.

FIG. 4A shows a perspective view of portioner 100 revealing the lower facing surface 121 of the nozzle platform 122. In embodiments, the nozzle opening 120 is positioned onto a downwardly-outcropped portion 124 of the lower facing surface 121. Again, the nozzle opening 120 is configured to allow the product to dispense from the conical aperture 170 of the nozzle platform 122 when the shaft 112 and the piston 118 are forced downwards forcing product into the conical shaped aperture 170 of the nozzle platform 122. In some embodiments, the diameter of the nozzle opening 120 may be interchangeable to accommodate different types or amounts of product and possibly to allow for different flow rates when dispensing product.

The dispensing of product from the nozzle opening 120 allows the product to collect in the dish 104 (FIG. 1 and FIG. 2A), which, in embodiments, is positioned on the scale 105. The nozzle platform 122 is mounted onto platform rods 126 which each pass through an extruded hole in the nozzle platform 122 on opposite sides. One end of each rod 126 is mounted and secured to a first rod mount 128 and the other end of each rod 126 is mounted and secured to a second rod mount 130. The rods 126 are sized to slide freely within the nozzle platform 122 when the second rod mount 130 is driven by a solenoid actuator 186 (see FIG. 2A).

Figure 4B:
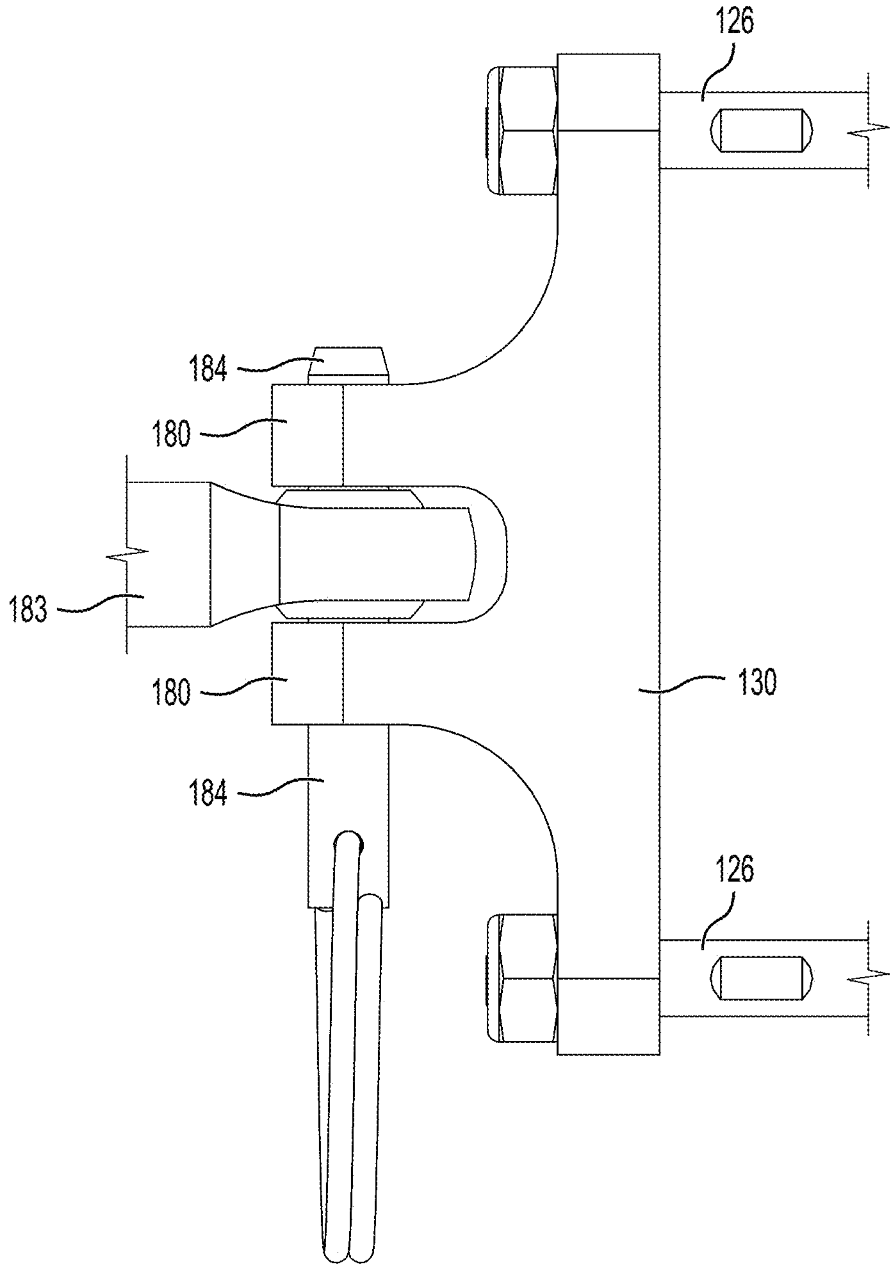
FIG. 4B is a top perspective view of a second rod mount of the dispensing portioner of FIG. 1.

FIG. 4B shows a top perspective view of the second rod mount 130 with respect to FIG. 4A. The second rod mount 130 includes two flanges 180 which each extend away from the plate of the second rod mount 130. Flanges 180 are spaced apart so a solenoid actuator rod 183 extending away from the shell 102 fits in between the two flanges 180. The flanges 180 and the solenoid actuator rod 183 are aligned so a pin connection 184 inserts through both of the two flanges 180 and the solenoid actuator rod 183. The pin connection 184 substantially supports the second rod mount 130 when inserted as shown and couples the second rod mount 130 to the solenoid actuator rod 183. The pin connection 184 may be slid out by a user to allow the second rod mount 130 and the attached nozzle platform 122 to be detached and removed from the portioner 100. The nozzle platform 122 may be removed each time the container 110 is removed from portioner 100.

Returning to FIG. 3A, the solenoid actuator rod 183 extends through the shell 102 to a solenoid actuator 186 configured within the shell 102. The solenoid actuator 186 is configured to rotate and drive the solenoid actuator rod 183 to extend or retract controlling the movement of the second rod mount 130 and the first rod mount 128 in a longitudinal horizontal direction perpendicular to the operating vertical axis of the piston 118. The rods 126 are configured to slide back and forth within the holes of the nozzle platform 122 so when the solenoid actuator rod 183 is driven by the solenoid actuator 186, the second rod mount 130 and the first rod mount 128 move perpendicularly across the dispensing direction of product. The nozzle platform 122 acts as a guide to aid in aligning the rods 126 when the solenoid actuator rod 183 is driven.

Returning to FIG. 4A, the first rod mount 128 secures an end of each rod 126 and an end of each wire rod 132. The wire rods 132 are positioned opposite one another on each side of the nozzle platform 122 and underneath the rods 126. One end of each wire rod 132 is mounted and secured into the first rod mount 128 with the other end of each wire rod 132 being an unattached free end. A wire 134 (see also FIG. 4A) extends laterally between the opposing wire rods 132 and is secured onto the free end of each wire rod 132. In embodiments, the wire 134 may be heated to facilitate cutting in instances when a particular product is more difficult to cut at lower temperatures. Other, more easily cut concentrate products may require little or no heat to be introduced into the wire 134. In embodiments, the wire 134 may be comprised of metal offering electrical resistance for the purpose of heat generation. In embodiments, wire 134 may be formed from nichrome or another similar material able to withstand elevated temperatures. In some embodiments, wire 134 may not be configured to have its temperature controlled.

The wire 134, physically, spans laterally between the opposing wire rods 132 beneath the nozzle platform 122. The solenoid actuator rod 183 is driven by the solenoid actuator 186 to extend or retract the second rod mount 130 and the attached rods 126, first rod mount 128, wire rods 132, and wire 134 while the nozzle platform 122 remains stationary. The longitudinal movement of the wire 134 which extends laterally beneath the nozzle platform 122 allows the wire 134 to move across the stationary nozzle opening 120.

Cuts are portioned by a control system which will be described in more detail hereinafter. Typically, the wire 134 will move crosswise across the opening 120 and back for each cut, and a run made for a full container of product will involve numerous independent cut actions each action resulting in a particular product amount.

When the dispensing of product from the nozzle opening 120 is stopped after a run of a full container, often drips or oozing may develop from the nozzle opening 120 and fall into the dish 104, which is suboptimal for measuring and dispensing precise amounts of product into the dish 104. The wire 134 is configured to be driven by the solenoid actuator rod 183 and physically moved across the nozzle opening 120 to substantially eliminate unwanted dripping by cutting through any concentrate product oozing out from the nozzle opening 120 after the product dispensing has stopped.

The wire 134 substantially controls and prevents oozing or dripping product from the nozzle opening 120 and cuts through the product dispensed from the nozzle opening 120 at the same vertical position relative the nozzle opening 120 making a clean cut. The physical movement of the wire 134 across the nozzle opening 120 cuts through the product at the same position, which adds an additional level of control of the portioning and dispensing process. The wire 134 substantially increases the precision and accuracy of the portioner 100 by adding additional control when dispensing and collecting controlled amounts of product.

Returning to FIG. 2A the dish 104 is positioned on an electronic scale 105 configured with the platform 106 beneath the container 110 and aligned with the nozzle opening 120. In embodiments, the platform 106 is configured with the weight detection scale 105 to detect the weight of the product dispensed into the dish 104. The scale 105 is communicatively connected to the controller 101 of the portioner 100.

The controller 101 controls the shaft motor 114 and the solenoid actuator 186 to control the dispensing and portioning of product and the movement of the wire 134. A user may input a product setpoint weight into the controller 101 using a human machine interface (HMI) 108. The controller 101 is configured to control mechanisms and is communicatively connected to the scale 105 to receive a weight reading and determine if more product is needed to meet the desired weight input by a user.

Figure 7:
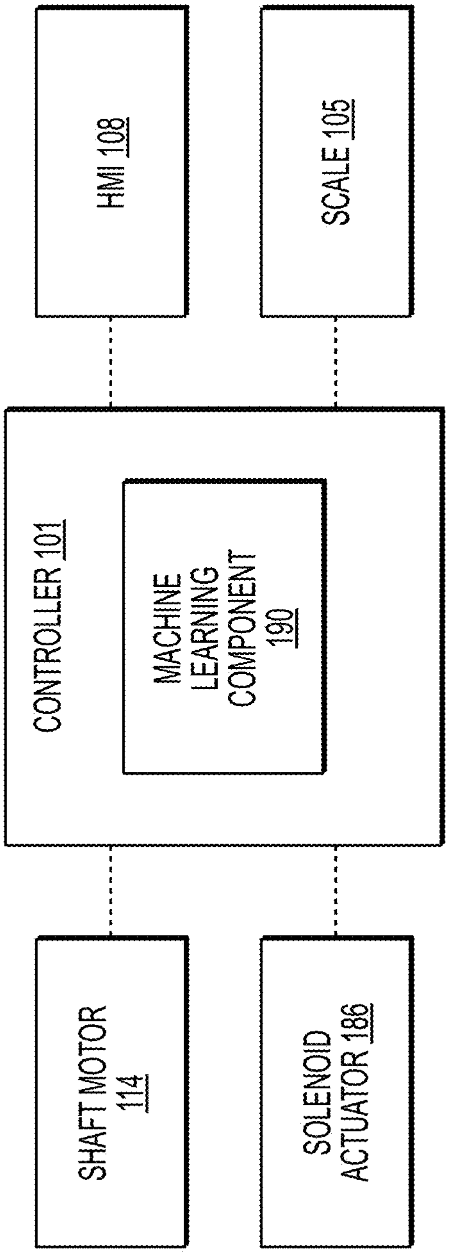
FIG. 7 is a system for having the dispensing portioner of FIG. 1.

The portioner 100 includes a HMI 108 (see FIGS. 1 and 7) which allows a user to interface with the controller 101 in FIG. 2A (see FIG. 7). The controller 101 can be a programmable logic controller configured to control mechanisms allowing a user to control the portioner 100. Processes are executed on the controller 101 which includes methods (FIG. 5A, 5B, and 5C) allowing the portioner 100 to adjust and control the amount of product dispensed by weight. The HMI 108 allows a user to control the machine by making inputs. For example, the user can initiate and terminate a product portioning process. In embodiments the HMI 108 may allow for a user to select from different types of concentrates or products to be portioned, so that a preset starting point can be known by the controller 101. In embodiments, concentrates or products such as rosin, live resin, fresh press, cold cure, or badder may be portioned by the portioner 100. Given a selection being made of a particular type of product, the portioner 100 can accurately dispense a desired amount of product with respect to different densities, consistencies, and properties associated with different types of products. The HMI 108, in embodiments, may have a display screen and can be a touchscreen allowing a user to input information and substantially control the portioner 100.

FIG. 7 shows a block diagram for having a portioner 100. The portioner 100 includes the controller 101 communicatively connected to the HMI 108, scale 105, shaft motor 114, and solenoid actuator 186. The controller 101 is configured to receive inputs from the HMI 108 and detections from the scale 105 to substantially control the amount of product dispensed from container 110 into dish 104. For instance, the controller 101 can determine a weight of product to dispense based upon a product weight setpoint input to the HMI 108. The controller 101 controls dispensing of the product by actuating the shaft 112 and piston 118 by controlling shaft motor 114. The controller 101 can determine when to actuate the solenoid actuator 186 to move the wire 134 and cut through product beneath the nozzle opening 120 and control the weight of the product which falls into dish 104. Controller 101 includes a machine learning component 190 which can include algorithms, programming, and a neural network.

The machine learning component 190 can receive product weight readings from scale 105 and a setpoint weight from the HMI 108. The machine learning component 190 can also receive information regarding the piston setpoint (i.e., piston rate or number of piston steps made by the piston 118) and when the solenoid actuator 186 moves the wire 134 to cut through dispensed product. Based on this information, the machine learning component 190 can determine a piston setpoint and wire actuations (i.e., time between when the wire 134 is moved across nozzle opening 120) which correspond to dispensed product weight. The machine learning component 190 can use machine learning techniques to determine a piston setpoint and wire actuations for setpoint weights input into HMI 108. For instance, a user can input a setpoint weight into HMI 108 and the controller 101 can control the shaft motor 114 and solenoid actuator 186 to dispense a product weight corresponding to the product setpoint weight into the dish 104. The scale 105 can detect the weight of the dispensed product and the machine learning component 190 can determine if the dispensed product weight is equal to the setpoint weight. If the dispensed product weight is not equal to the setpoint weight the machine learning component 190 can make adjustments to the shaft motor 114 and solenoid actuator 186 which may be modifying a piston setpoint and modifying a wire setpoint such that the dispensed product weight is equal to the setpoint weight input into HMI 108. In this way, the machine learning component 190 makes modifications to recognize motor settings such as piston setpoints and wire actuations that correspond to different dispensed product weights.

In some embodiments, controller 101 can control the shaft motor 114 to provide pullback to substantially reduce the risk of buildup and inconsistent product dosing. Since the product being dispensed can have a variety of internal air pockets, viscosity, and consistency, oozing can occur from nozzle opening 120 in between product doses. Some products which are wet and viscous can be more likely to ooze than drier and less viscous products. Oozing can impact and decrease the accuracy of dispensing a correct product weight. To remedy this, pullback can be provided to substantially "suck" some of the remaining product back into the nozzle opening 120 and prevent the product from oozing out of nozzle opening 120. In some embodiments, the controller 101 can provide pullback when a pullback setpoint input is received by the HMI 108.

Pullback as used in embodiments (see FIG. 5C) is a process which uses a piston to first increase pressure in a container and then immediately "pulls back" to decrease the pressure and create a vacuum effect in the container. In embodiments, the momentary increase and the immediate decrease in air pressure within the container 110 allows for the product to be dispensed and then immediately sucked up into the container 110, which prevents oozing from nozzle opening 120. Pullback, in embodiments, corresponds to first driving the shaft 112 and piston 118 downwards in container 110 simultaneously decreasing the volume of the container 110 beneath the piston 118 compressing air and the product. Then, second, moving the shaft 112 and piston 118 upwards simultaneously increases the volume of the container beneath the piston 118, decompressing the air and product in container 110 and creating a vacuum or sucking effect.

Doing this allows for the product to be first dispensed from nozzle opening 120 and then withdrawn back into the container 110. This substantially prevents the product from oozing out of nozzle opening 120 in between product doses when product is not being dispensed.

For instance, a setpoint weight of one gram of product and a pullback setpoint of fifty may be input into the HMI 108. The setpoint weight of one gram can have a corresponding piston setpoint (possibly determined by controller 101 or a user) of one hundred steps (i.e., a step being an increment the piston 118 is driven within container 110). The controller 101 can receive the input and adjust the piston setpoint to one-hundred fifty steps downwards followed by moving the piston upwards fifty steps (i.e., the fifty steps upward is the pullback) such that the piston setpoint is one hundred steps. In embodiments, the amount of pullback may be related to the consistency and density of the product. For example, a product with a stiff consistency may require a greater amount of pullback than a product with a looser consistency. In some embodiments, a user or operator can determine the amount of pullback and in other embodiments the machine learning component 190 can determine an amount of pullback based upon a setpoint weight and a type of product.

Figure 5A:
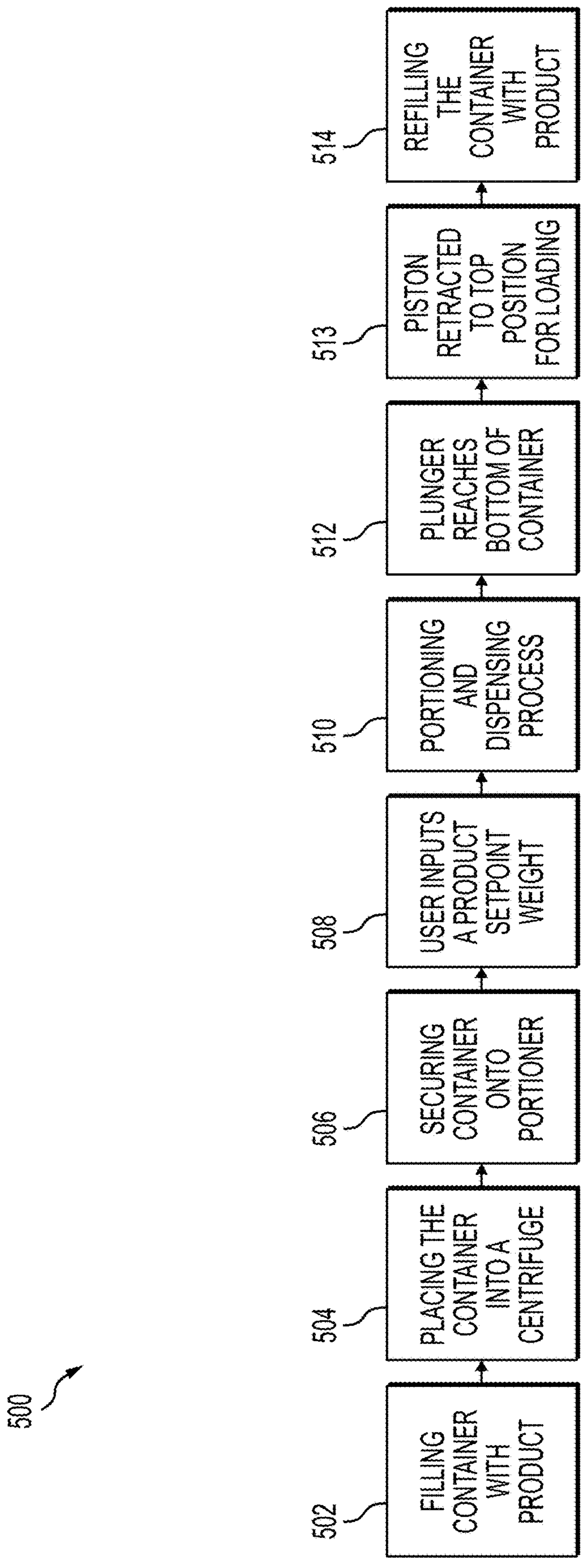
FIG. 5A is a high-level method flow diagram executable with the dispensing portioner of FIG. 1.

FIG. 5A shows a high-level method flow diagram 500 for using a dispensing portioner 100.

In a step 502, the container 110 is filled with a product. In embodiments, the product may be a type of rosin and can have a variety of different densities and consistencies. In some embodiments, the container 110 may be able to hold approximately two-hundred twenty grams of product and can be manually filled by a user or operator.

Figure 8A:
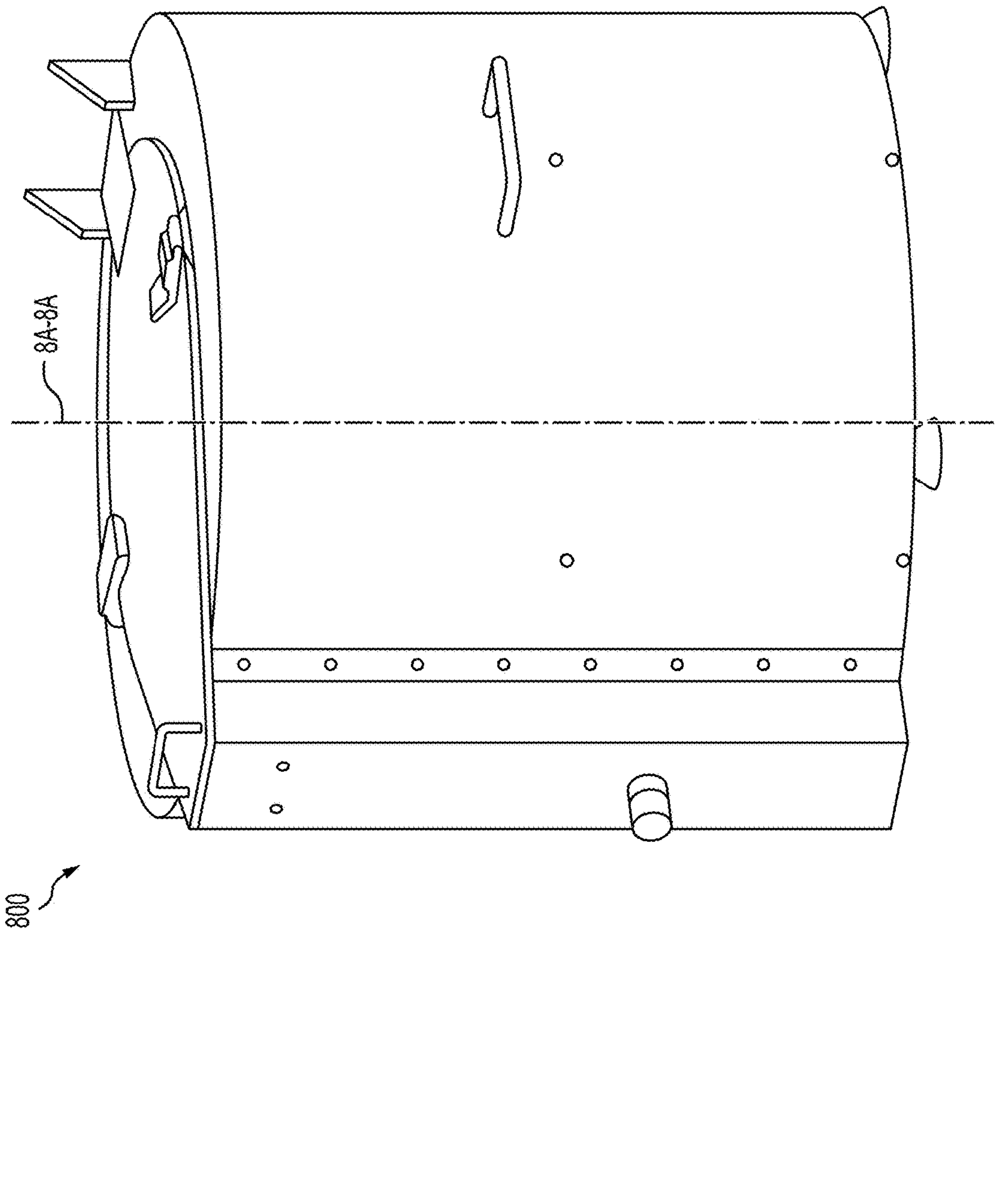
FIG. 8A is a perspective view of a centrifuge of embodiments of the present disclosure.
Figure 8B:
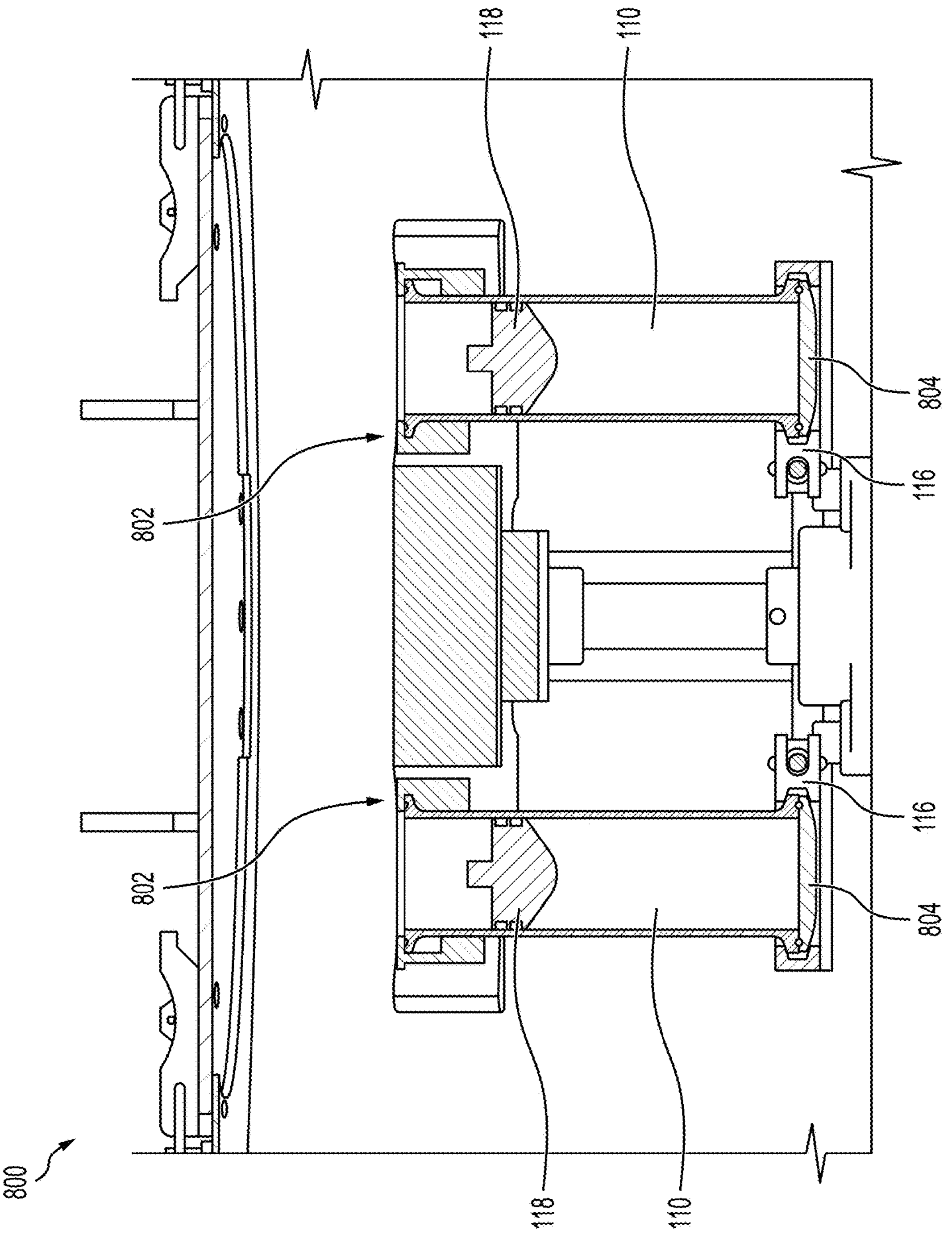
FIG. 8B is a cross-sectional view of the centrifuge of FIG. 8A taken along the line 8A-8A with a container in a vertical position.
Figure 8C:
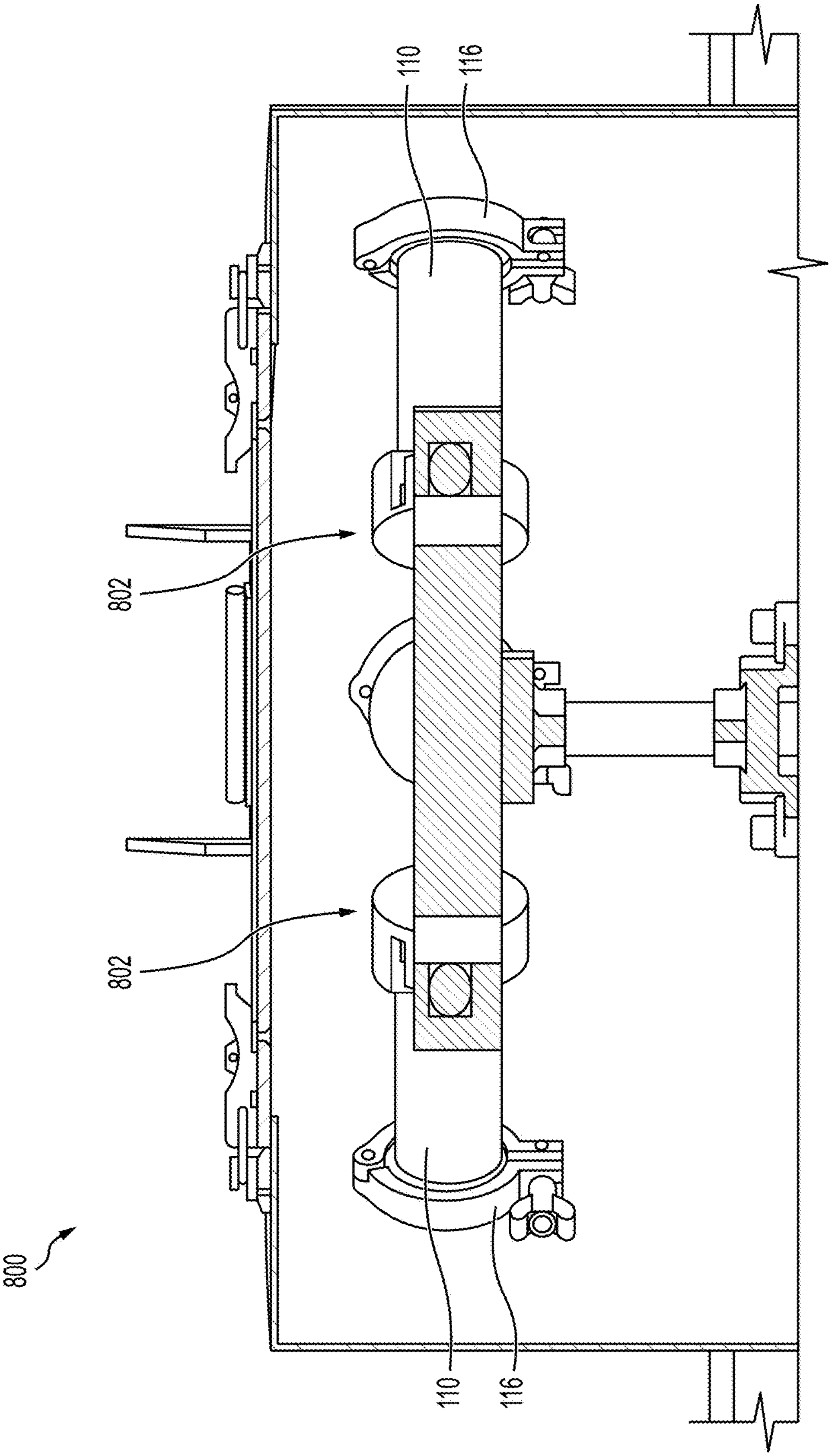
FIG. 8C is a cross-sectional view of the centrifuge of FIG. 8A taken along the line 8A-8A with a container in a horizontal position.

In a step 504, the container 110 is placed into a centrifuge. In embodiments, centrifuge 800 is shown in FIGS. 8A, 8B, and 8C. The centrifuge 800 rapidly spins (i.e., centrifuges) the container 110 and the centripetal force substantially forces any air pockets or air bubbles out of the product within the container 110. In the cross section taken along the line 8A-8A shown in FIG. 8B, the container 110, 118, and clamps 116 are positioned vertically within centrifuge 800. The container 110 pivotally attaches at one end to hinges 802. The pivotal attachment of container 110 to hinges 802 allows for the container 110 to swing outwards horizontally when the centrifuge 800 spins (see FIG. 8C). When the container 110 swings outward the piston 118 moves towards the end of container 110 and substantially compresses product within container 110 and substantially removes air within the product. The removal of air creates a more solid and less porous product or concentrate which makes it fully dense and more accurate to dispense. The centripetal force created from centrifuging the container 110 within the centrifuge 800 forces the product to an end of the container 110. After centrifuging, the container 110 can be removed from centrifuge 800 with or without clamps 116 and piston 118. In some embodiments, caps 804 can be placed on ends of the container 110 and keep product from exiting the container 110.

In a step 506, the container 110 is secured onto the portioner 100. The container 110 is secured using a pair of removable clamps 116 each configured to slide over and wrap around upper and lower portions of the container 110. The flanges 111 of the container 110 insert into the grooves 117 of the clamping arms 115. The container 110 is configured such that the piston head 118 attached to the shaft 112 may be driven along the interior walls of the container 110. The dish 104 may also be aligned under the nozzle opening 120 and positioned onto the weight scale 105 configured with the platform 106.

In a step 508, a user uses the HMI 108 to input a setpoint weight of product to be dispensed into the dish 104. The product setpoint weight is then received by the controller 101 which then transmits a signal to the motor 114 to drive the shaft 112 downward to an extent which is predetermined to dispense the proper product dose weight.

In a step 510, the product setpoint weight is dispensed into the dish 104. The product is dispensed when the controller 101 commands the shaft motor 114 to drive the shaft 112 downwards. When the shaft 112 is driven downwards, the piston 118 is driven downwards within the container 110 such that the outer edges of the piston 118 and the inner walls of the container 110 directly contact one another. The product along the inner walls and bottom of the container 110 is forced downwards in the container 110 by the piston 118. As the piston 118 moves downwards, the product is pressed downward through the chamber 170 and out the nozzle opening 120. The commands received by the motor 114 from the controller 101 drive the piston head 118 downward to an extent that delivers the proper metered amount of product through the nozzle opening 120 such that a cut can be made and the product dose dropped into the dish 104.

Figure 5B:
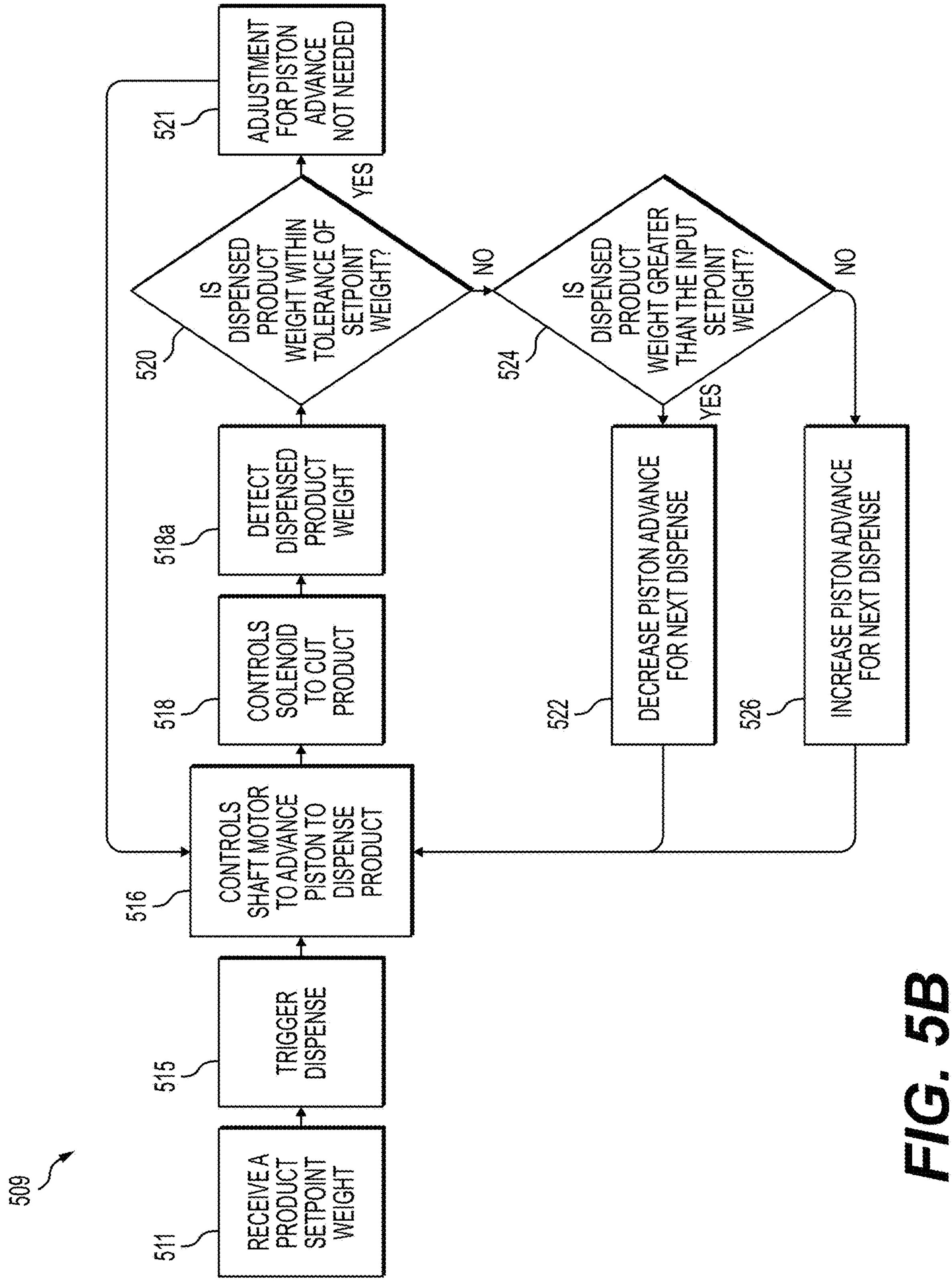
FIG. 5B is a logic flow used by the controller of the dispensing portioner of FIG. 1 in embodiments.

In embodiments, the controller 101 uses machine learning component 190 of FIG. 7 and outlined in the logic flow of FIG. 5B to have increased accuracy dispensing and portioning the input product setpoint weight into the dish 104. The step 510 may be repeated numerous times before the method 500 advances to step 512.

In a step 512, the piston 118 reaches the bottom of the container 110 which is detected by the controller 101. This detection can occur due to a known piston reference position, back force detection process, or some other method. This occurs when substantially all of the product has been portioned and dispensed from the container 110 and the container 110 is substantially empty. The controller 101 then controls the shaft motor 114 to stop driving the shaft 112 downwards which ceases the dispense of product.

In a step 513, the piston 118 is retracted to its uppermost position so that the container 110 may be removed for loading of product.

In a step 514, the container 110 is removed and refilled with product. When empty, the container 110 may be removed by loosening the clamps 116 and then refilled with product. The container 110, clamps 116, and piston 118 may then be placed into the centrifuge and the method 500 repeated.

The container 110 in embodiments is not required to be removed each time an input product setpoint weight is dispensed and is only required to be removed when the refillable container empty and all the product has been dispensed. The dish 104 may be replaced each time after a setpoint weight has been dispensed by the portioner 100.

FIG. 5B shows a diagram showing a logic flow 509 carried out by the controller 101 in the step 510 of the method 500.

In a step 511, in the FIG. 5B process, the controller 101 receives the user input made in step 508 from FIG. 5A flow diagram 500. In this step the controller 101 receives the product setpoint weight input. The product setpoint weight input in embodiments is a product weight to be dispensed by portioner 100. The product setpoint weight may be input by a user or operator using the HMI 108. In some embodiments, the user may specify a product or product type and a number of iterations for the product setpoint weight to be dispensed.

In a step 515, the controller 101, upon receiving the product setpoint weight, triggers dispensing of a product portion. The dispense of product may be triggered using the HMI 108 or by a foot pedal connected to the controller 101 controlling the dispense of product or by some other user interface means. In some embodiments, the dispense of product may be triggered when a dish 104 is placed on the scale 105 and the scale 105 detects the weight of the dish 104. Any of the triggers described above may be used in combination or separately to trigger dispense of product.

In a step 516, the controller 101 controls the shaft motor 114 to physically drive shaft 112 (thus advancing the piston 118) downwards in the container 110 a set distance. This translation forces product out from the nozzle opening 120 to produce a product weight. The motor 114 then, once the desired translation has been executed, stops driving the shaft 112. This leaves a desired portion suspended out from and below opening 120, setting up a cut, the dispensed product will be collected into the dish 104 positioned on the scale 105 and aligned under the nozzle opening 120. In some embodiments, controller 101 can make a determination of a motor setting, which will be required to translate the drive shaft 112 to a particular translation distance, which results in dispensing the input product setpoint weight. In embodiments, the controller 101 can use machine learning techniques and data (i.e., machine learning component 190), which can include product setpoint weights and corresponding dispensed product weights to determine piston setpoints to drive shaft 112. In this way, the controller can learn which piston setpoints correspond to dispensed product weights so that the dispensed product weight is substantially equal to the product setpoint weight. In embodiments, the amount of product dispensed may be from approximately half a gram to five grams.

In terms of the actual cut being made, in a step 518, the controller 101 commands the solenoid actuator 186 to drive the solenoid actuator rod 183 forward to drive the wire 134 towards the suspended dispensed product. Thus, in response to the commands from the controller 101 the solenoid actuator 186 shifts the wire 134 across the nozzle opening 120 so that the wire 134 cuts through any product protruding from the nozzle opening 120. Any product cut off using the wire 134 will collect into the dish 104 as a dispensed product weight. The weight of product portions can be increased or decreased between cuts if the user changes the setpoint weight (see step 508 FIG. 5A) at any time. Once dropped below into the dish 104 after a cut, the weight of the portion of product is detected by the scale 105 as seen in step 518*a*. This detected weight is then recorded by the controller 101.

In a step 520, the controller 101 uses machine learning component 190 to communicate with the scale 105 to determine if the product dispensed into the dish 104 (i.e., dispensed product weight) is within the tolerance of the product setpoint weight input to the HMI in step 508. Those skilled in the art will recognize that machine learning components typically use algorithms and or programming processes to dynamically execute tasks. More specifically, they output models containing data and use established guidelines to use that data to predict results. Here, the recorded setpoint weights and resulting dispensed product weights are recorded over time, and the machine learning processes on the controller 101 are used to change piston setpoint values in response to real world weight portioning results to improve the accuracy of subsequent results. If the dispensed product weight is within the input product setpoint weight, the process proceeds to step 521. In step 521, no adjustment affecting the distance of the piston 118 advance within the container 110 is needed and the process loops back to step 516. If the weighed product is not within the input at step 508, then the process proceeds to step 524.

In step 524, the controller 101 receives weight readings from the scale 105 to determine if the dispensed product weight in the dish 104 is greater than the product setpoint weight input in step 508. If the dispensed product weight is greater than the product setpoint weight at step 508, the controller 101 uses a machine learning feedback path 522 (using machine learning component 190 which can utilize stored data based on past dosing results), which loops back to step 516, controlling the amount of product dispensed. The machine learning component 190 may communicate with controller 101 to decrease the piston setpoint (i.e., piston step increments) the piston 118 is advanced in the container 110 before the wire 134 cuts through the dispensed product. The machine learning component 190 may communicate with controller 101 to decrease the flow rate of product dispensed by slowing the piston 118 advance within the container 110 to decrease the flow rate of product dispensed. The decrease of flow rate or the decrease of piston 118 advance may occur separately or together to substantially decrease the rate and weight of the portion of product dispensed. Alternatively, the machine learning component 190 could be operated based on current and past translation differences, or any other parameter reflective of a resulting portion weight either together with, or independently relative to flow rate data.

If the product weight is less than the specified setpoint weight in the input product setpoint weight at step 508, the controller 101 uses a machine learning feedback path 526 (i.e., machine learning component 190), which loops back to the step 516. The feedback path 526 may provide the weight of the product to the controller 101 such that the controller 101 is able to use machine learning component 190 to increase the piston setpoint the piston 118 is advanced in the container 110 before the wire 134 cuts through the dispensed product. The machine learning component 190 may communicate with controller 101 to increase the flow rate of product dispensed by increasing the rate the piston 118 advances within the container 110.

The increase of flow rate or the increase of advance of piston 118 may occur separately or together to substantially increase the weight and rate of the portion of product dispensed. The machine learning component 190 uses feedback paths 522 and 526 to provide controller 101 with feedback based upon the amount of product dispensed into the dish 104 after the wire 134 has cut through any product oozing from the nozzle opening 120 which may impact the weight of the product in the dish 104. The machine learning component 190 is used by the controller 101 to more accurately control the dispensed amount of product in step 516. In embodiments, the controller 101 will substantially improve its accuracy when dispensing amounts of product using the machine learning component 190 which collects feedback using paths 522 and 526. The feedback paths 522 and 526 provide information for the machine learning component 190 to learn and adjust such that as the controller 101 dispenses portions numerous times, the controller 101 will become more accurate at dispensing the input product setpoint weight. In some embodiments, the controller 101 may be able to flag overweight and underweight portions dispensed into the dish 104 as the method 500 is repeated.

Figure 5C:
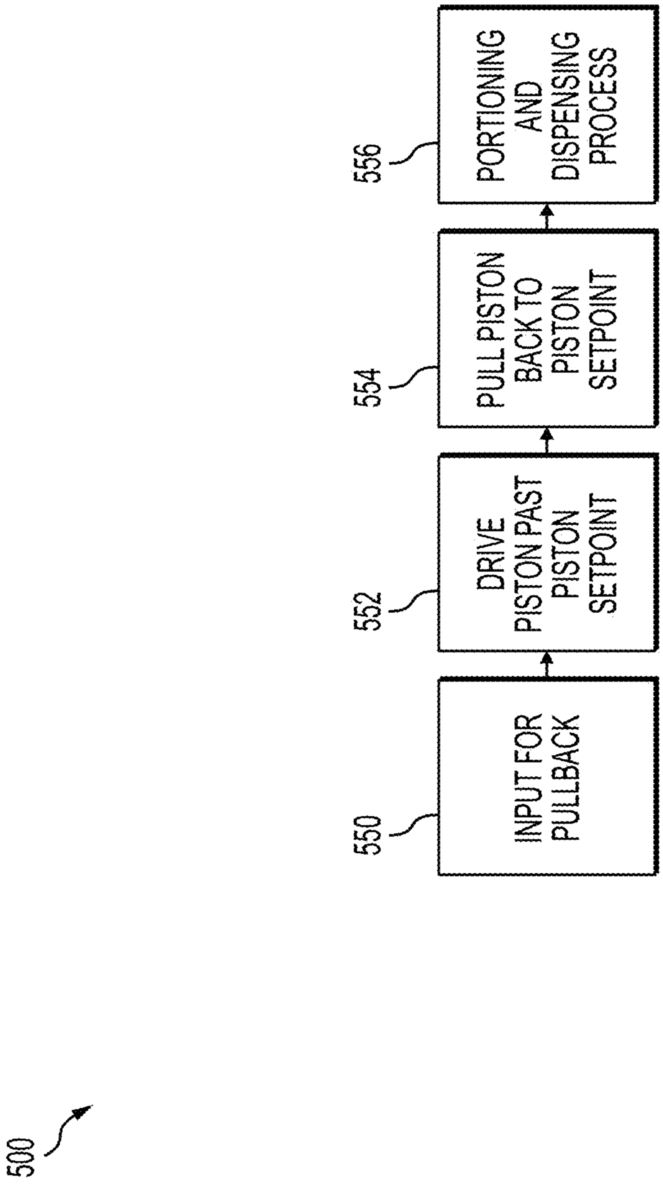
FIG. 5C is another logic flow executable by the controller of the dispensing portioner of FIG. 1 in embodiments.

FIG. 5C shows a logic flow carried out by the controller 101 in the step 510 of the method 500. The logic flow of FIG. 5C allows for pullback which can substantially increase the accuracy of dispensing product portions and reduce oozing of product when product dispense is not triggered. The logic flow of FIG. 5C can be used in combination with or in place of the logic flow disclosed in FIG. 5B.

In a step 550, an input can be received by controller 101 which corresponds to pullback. For instance, the HMI 108 can receive an input from a user or operator which requests for the controller 101 to dispense a product setpoint weight using pullback.

In a step 552, the controller 101 controls shaft motor 114 to drive the piston 118 downwards in the shaft past a piston setpoint. The piston setpoint may be determined by controller 101 and machine learning component 190 and corresponds to a number of steps (i.e., a distance) the piston 118 is driven downwards for dispensing a product setpoint weight. For instance, the controller 101 and/or machine learning component 190 may determine that an input product setpoint weight of two grams of product corresponds to a piston setpoint of one-hundred steps downwards of piston 118. At step 552, the controller 101 may move the piston one-hundred-fifty steps downward past the piston setpoint of one-hundred steps. When the piston 118 is driven downwards, the air and product beneath the 118 in container 110 is compressed and product can be forced out of nozzle opening 120.

In a step 554, the controller 101 pulls back piston 118 to the piston setpoint. When the piston 118 is pulled back (i.e., moved upwards) to the piston setpoint, a vacuum effect can be created in the container 110 which sucks the product into the container 110. For instance, if product is hanging below nozzle opening 120 the pull back of piston 118 can substantially pull any downwardly extending product remaining after the cut back into the container 110. In this way, oozing can be prevented such that accurate weights of product can be dispensed. Continuing in the example from above at step 552, if the piston 118 is moved past the piston setpoint by fifty steps, at step 554 the piston 118 can be pulled back and moved upwards fifty steps to meet the piston setpoint of 110 steps. In some embodiments, a user or operator can set the piston setpoint and a pullback for the controller. In other embodiments, a user or operator can opt for pullback and the controller 101 and/or machine learning component 190 can select the piston setpoint and an amount of pullback. In some embodiments, products with viscous or wet consistency may require pullback to prevent oozing and products which are stiffer may require a greater amount of pullback than products with very viscous or wet consistency.

At step 556, the product is dispensed into dish 104 and steps 550-556 can be repeated. In embodiments, the steps of 550 through 556 in FIG. 5C can be executed by the controller after every cut although not shown in either of FIG. 5A or 5B. In alternative embodiments, the pull-back subprocesses can be selectively or singly executed.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A portioner comprising:
- a user interface communicatively connected to a controller configured to receive a product setpoint weight;
- a scale communicatively connected to the controller and configured to detect a dispensed product weight when product is dispensed out of a container;
- the controller being communicatively and operatively connected to a shaft motor wherein the shaft motor is configured to drive a piston within the container and force the product out of the container;
- the controller being configured to:
  - receive the product setpoint weight and determine a piston setpoint based on the product setpoint weight; and
  - implement the piston setpoint to the piston and dispense the product out of the container;
- when the product is dispensed, the controller being configured to receive the dispensed product weight and modify the piston setpoint based on the dispensed product weight.

2. The portioner of claim 1, comprising a nozzle opening wherein the product in the container is directed out of the nozzle opening when the product is being dispensed.

3. The portioner of claim 1, wherein the piston is mounted to an end of a drive shaft and the shaft motor actuates the drive shaft.

4. The portioner of claim 1, wherein the piston includes a downwardly-extending conical end configured to form a seal against inner walls of the container when the piston is driven in the container.

5. The portioner of claim 2, comprising a wire positioned beneath the nozzle opening and configured to move across the nozzle opening and cut through the product when the piston forces the product out of the nozzle opening.

6. The portioner of claim 1, comprising a pair of clamps configured to secure the container to the portioner.

7. The portioner of claim 1, wherein the container comprises flanges which extend from the container at either end.

8. The portioner of claim 7, wherein the pair of clamps includes a groove configured to receive the flanges and secure the container to the portioner.

9. The portioner of claim 1, wherein the controller includes a machine learning component comprising data corresponding to piston setpoints and dispensed product weights, and product setpoint weights.

10. The portioner of claim 9, wherein the machine learning component determines the piston setpoint based on the product setpoint weight.

11. The portioner of claim 9, wherein when the product is dispensed, the machine learning component receives the dispensed product weight and modifies the piston setpoint based on the dispensed product weight.

12. The portioner of claim 1, wherein the controller implements pullback to the piston which causes product hanging from beneath the nozzle opening to be sucked back into the container.

13. The portioner of claim 1, wherein the user interface is a touchscreen interface.

14. A method for dispensing a product with a portioner, the method comprising:
- receiving a product setpoint weight from a user interface wherein the product setpoint weight is an amount of product to be dispensed from a container;

determining a piston setpoint based upon the product setpoint weight wherein the piston setpoint corresponds to a distance a piston is driven within the container;

driving the piston within the container to dispense the product;

receiving a dispensed product weight from a scale configured to collect product dispensed from the container; and modifying the piston setpoint based upon the product setpoint weight and the dispensed product weight.

15. The method of claim 14, comprising centrifuging the container loaded with product in a centrifuge prior to driving the piston within the container.

16. The method of claim 14, comprising securing the container to the portioner using a pair of clamps prior to driving the piston within the container.

17. The method of claim 14, comprising modifying the piston setpoint to provide pullback thereby creating a vacuum within the container which can pull product hanging beneath a nozzle opening of the container back into the container.

18. The method of claim 14, wherein the piston is driven by a drive shaft connected to a shaft motor.

19. The method of claim 17, comprising moving a wire across the nozzle opening and cutting through the product hanging beneath the nozzle opening.

20. A portioner comprising:

a piston mounted to a drive shaft configured to drive the piston upwards and downwards in a container;

a nozzle opening configured to align with the container and direct a product out of the container when the piston is driven downwards;

a wire positioned beneath the nozzle opening and configured to move across the nozzle opening and cut through the product when the piston forces the product out of the nozzle opening; and a controller configured to receive a product selection and determine at least one piston setting which corresponds to the product selection, wherein the at least one piston setting corresponds to directing the product out of the container, and pulling product suspended beneath the nozzle opening back into the container.

* * * * *